(12) United States Patent
Charlesworth et al.

(10) Patent No.: US 7,240,003 B2
(45) Date of Patent: Jul. 3, 2007

(54) DATABASE ANNOTATION AND RETRIEVAL

(75) Inventors: Jason Peter Andrew Charlesworth, Surrey (GB); Philip Neil Garner, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 888 days.

(21) Appl. No.: 10/363,752

(22) PCT Filed: Sep. 28, 2001

(86) PCT No.: PCT/GB01/04331

§ 371 (c)(1),
(2), (4) Date: Mar. 7, 2003

(87) PCT Pub. No.: WO02/27546

PCT Pub. Date: Apr. 4, 2002

(65) Prior Publication Data

US 2003/0177108 A1    Sep. 18, 2003

(30) Foreign Application Priority Data

Sep. 29, 2000   (GB) .............................. 002390.1

(51) Int. Cl.
*G10L 15/04* (2006.01)
(52) U.S. Cl. ................................... 704/254
(58) Field of Classification Search ............... None
See application file for complete search history.

(56) References Cited

U.S. PATENT DOCUMENTS

| | | | |
|---|---|---|---|
| 4,227,176 A | 10/1980 | Moshier | 340/146.3 |
| 4,736,429 A | 4/1988 | Niyada et al. | 381/43 |
| 4,903,305 A | 2/1990 | Gillick et al. | 381/41 |
| 4,975,959 A | 12/1990 | Benbassat | 381/41 |
| 4,980,918 A | 12/1990 | Bahl et al. | 381/43 |
| 4,985,924 A | 1/1991 | Matsuura | 381/43 |
| 5,075,896 A | 12/1991 | Wilcox et al. | 382/39 |
| 5,131,043 A | 7/1992 | Fujii et al. | 381/41 |

(Continued)

FOREIGN PATENT DOCUMENTS

EP           597798           5/1994

(Continued)

OTHER PUBLICATIONS

Jonathan Harrington, Jane Johnstone: "The Effects of Equivalence Classes on Parsing Phonemes into Words in Continuous Recognition", (1987) 22, Sep./Dec. Nos. 3-4, London, Great Britain; pp. 273-288, 1987.

(Continued)

*Primary Examiner*—Abul K. Azad
(74) *Attorney, Agent, or Firm*—Fitzpatrick, Cella, Harper & Scinto

(57) ABSTRACT

A data structure is provided for annotating data files within a database. The annotation data comprises a phoneme and word lattice which allows the quick and efficient searching of data files within the database, in response to a user's input query for desired information. The phoneme and word lattice comprises a plurality of time-ordered nodes, and a plurality of links extending between the nodes. Each link has a phoneme or word associated with it. The nodes are arranged in a sequence of time-ordered blocks such that further data can be conveniently added to the lattice.

51 Claims, 28 Drawing Sheets

U.S. PATENT DOCUMENTS

| | | | |
|---|---|---|---|
| 5,136,655 A | 8/1992 | Bronson | 381/41 |
| 5,202,952 A | 4/1993 | Gillick et al. | 395/2 |
| 5,333,275 A | 7/1994 | Wheatley et al. | 395/2.52 |
| 5,390,278 A | 2/1995 | Gupta et al. | 395/2.52 |
| 5,500,920 A | 3/1996 | Kupiec | 395/2.79 |
| 5,577,249 A | 11/1996 | Califano | 395/611 |
| 5,594,641 A | 1/1997 | Kaplan et al. | 395/601 |
| 5,638,425 A | 6/1997 | Meador, III et al. | 379/88 |
| 5,640,487 A | 6/1997 | Lau et al. | 395/2.52 |
| 5,649,060 A | 7/1997 | Ellozy et al. | 395/2.87 |
| 5,675,706 A | 10/1997 | Lee et al. | 395/2.65 |
| 5,680,605 A | 10/1997 | Torres | 395/603 |
| 5,684,925 A | 11/1997 | Morin et al. | 395/2.63 |
| 5,708,759 A | 1/1998 | Kemeny | 395/2.63 |
| 5,721,939 A | 2/1998 | Kaplan | 395/759 |
| 5,729,741 A | 3/1998 | Liaguno et al. | 395/615 |
| 5,737,489 A | 4/1998 | Chou et al. | 395/2.65 |
| 5,737,723 A | 4/1998 | Riley et al. | 704/243 |
| 5,752,227 A | 5/1998 | Lyberg | 704/235 |
| 5,781,884 A | 7/1998 | Pereira et al. | 704/260 |
| 5,787,414 A | 7/1998 | Miike et al. | 707/2 |
| 5,799,267 A | 8/1998 | Siegel | 704/1 |
| 5,835,667 A | 11/1998 | Wactlar et al. | 386/96 |
| 5,852,822 A | 12/1998 | Srinivasan et al. | 707/4 |
| 5,870,740 A | 2/1999 | Rose et al. | 707/5 |
| 5,873,061 A | 2/1999 | Häb-Umbach et al. | 704/254 |
| 5,907,821 A | 5/1999 | Kaji et al. | 704/4 |
| 5,983,177 A | 11/1999 | Wu et al. | 704/244 |
| 5,999,902 A | 12/1999 | Scahill et al. | 704/240 |
| 6,023,536 A | 2/2000 | Visser | 382/310 |
| 6,026,398 A | 2/2000 | Brown et al. | 707/5 |
| 6,061,679 A | 5/2000 | Bournas et al. | 707/3 |
| 6,070,140 A | 5/2000 | Tran | 704/275 |
| 6,122,613 A | 9/2000 | Baker | 704/235 |
| 6,172,675 B1 | 1/2001 | Ahmad et al. | 345/328 |
| 6,182,039 B1 | 1/2001 | Rigazio et al. | 704/257 |
| 6,192,337 B1 | 2/2001 | Ittycheriah et al. | 704/231 |
| 6,236,964 B1 | 5/2001 | Tamura et al. | 704/254 |
| 6,243,680 B1 | 6/2001 | Gupta et al. | 704/260 |
| 6,272,242 B1 | 8/2001 | Saitoh et al. | 382/187 |
| 6,289,140 B1 | 9/2001 | Oliver | 382/313 |
| 6,314,400 B1 | 11/2001 | Klakow | 704/257 |
| 6,321,226 B1 | 11/2001 | Garber et al. | 707/10 |
| 6,389,395 B1 | 5/2002 | Ringland | 704/254 |
| 6,463,413 B1 | 10/2002 | Applebaum et al. | 704/256 |
| 6,487,532 B1 | 11/2002 | Schoofs et al. | 704/251 |
| 6,490,563 B2 | 12/2002 | Hon et al. | 704/260 |
| 6,535,850 B1 | 3/2003 | Bayya | 704/239 |
| 6,567,778 B1 | 5/2003 | Chao Chang et al. | 704/257 |
| 6,567,816 B1 | 5/2003 | Desai et al. | 707/102 |
| 6,662,180 B1 | 12/2003 | Aref et al. | 707/6 |
| 6,990,448 B2 * | 1/2006 | Charlesworth et al. | 704/243 |
| 2002/0022960 A1 | 2/2002 | Charlesworth et al. | 704/251 |
| 2002/0052740 A1 | 5/2002 | Charlesworth et al. | 704/220 |

FOREIGN PATENT DOCUMENTS

| | | |
|---|---|---|
| EP | 649144 | 4/1995 |
| EP | 689153 | 12/1995 |
| EP | 789349 | 8/1997 |
| EP | 849723 | 6/1998 |
| GB | 2302199 | 1/1997 |
| GB | 2331816 | 6/1999 |
| GB | 2349260 | 10/2000 |
| WO | WO 98/47084 | 10/1998 |
| WO | WO 99/05681 | 2/1999 |
| WO | 00/31723 | 6/2000 |
| WO | WO 00/54168 | 9/2000 |
| WO | WO 01/31627 | 5/2001 |

OTHER PUBLICATIONS

Steve Reynolds, David McKelvie, Fergus McInnes: "A Comparative Study of Continuous Speech Recognition using Neural Networks and Hidden Markov Models", 1991, Proceedings IEEE International Conference on Acoustics, Speech and Signal Processing, pp. 369-372, Toronto.

F. Schiel et al., "The Partitur Format at BAS", In Proc. of the First Int'l. Conference on Language Resources and Evaluation, Granada, Spain, 1998.

Gerber, C., "A General Approach to Speech Recognition", *Proceedings of the Final Workshop on Multimedia Information Retrieval (Miro '95)*, Glasgow, Scotland (Sep. 18-20, 1995) pp. 1-12.

Okawa, S. et al., "Automatic Training of Phoneme Dictionary Based on Mutual Information Criterion", *IEEE* (1994), pp. 241-244.

Rahim, M. et al., "A Neural Tree Network for Phoneme Classification With Experiments on the Timit Database", *IEEE* (1992), pp. II-345-II-348.

Sankoff, D., et al, "Time Warps, String Edits, And Macromolecules: The Theory And Practice Of Sequence Comparison", Bell Laboratories and David Sandkoff (1983), Ch. One, pp. 1-44; Part Three, pp. 211-214; Ch. Eleven, pp. 311-321, Ch. Sixteen, pp. 359-362.

Wang, H., "Retrieval of Mandarin Spoken Documents Based on Syllable Lattice Matching", *Pattern Recognition Letters* (Jun. 2000), 21, pp. 615-624.

Bahl, L. R., et al., "A Method For The Construction Of Acoustic Markov Models For Words", *IEEE Transactions on Speech and Audio Processing*, vol. 1, No. 4 (Oct. 1993), pp. 443-452.

Berge, C., "Graphs And Hypergraphs", North Holland Mathematical Library, Amsterdam (1976) p. 175.

Besling, S., "A Statistical Approach To Multilingual Phonetic Transcription", *Philips J. Res.*, vol. 49 (1995), pp. 367-379.

Bird, S. & Liberman, M., "A Formal Framework For Linguistic Annotation", *Linguistic Data Consortium, University of Pennsylvania*, Tech. Report No. MS-CIS-99-01 (Mar. 1999), pp. 1-48.

Bird, S. & Liberman, M., "Towards A Formal Framework For Linguistic Annotations", *Linguistic Data Consortium, University of Pennsylvania*, Presented at ICSLP (Sydney, Dec. 1998), 12 pages.

Cassidy, S. & Harrington, J., "EMU: An Enhanced Hierarchical Speech Data Management System", *Proc. of the 6th Australian Speech Science and Technology Conference* (Adalaide, 1996), pp. 381-386.

Foote, J. L., et al., "Unconstrained Keyword Spotting Using Phone Lattices With Application to Spoken Document Retrieval", *Computer Speech and Language* (1997), vol. II, pp. 207-224.

Gagnoulet, C., et al., "Mairievox: A Voice-Activated Information System", *Speech Communication*, Amsterdam, NL, 10(Feb. 1991), No. 1, pp. 23-31.

Gelin, P. & Wellekens, C. J., "Keyword Spotting For Video Soundtrack Indexing", *1996 IEEE Int. Conf. on Acoustics, Speech, and Sig. Proc.*, ICASSP-96, Conference Proceedings (May 7-10, 1996), vol. 1, pp. 299-302.

Haeb-Umbach, R., et al, "Automatic Transcription Of Unknown Words In A Speech Recognition System", IEEE (1995), pp. 840-843.

Jain, N., et al., "Creating Speaker-Specific Phonetic Templates With A Speaker-Independent Phonetic Recognizer: Implications For Voice Dialing", IEEE (1996), pp. 881-884.

James, D.A. & Young, S. J., "A Fast Lattice-Based Approach To Vocabulary Independent Wordspotting", 1994 *IEEE Int. Conf. on Acoustics, Speech and Sig. Proc.*, ICASSP-94, vol. i (Adelaide, Australia, Apr. 19-22, 1994), pp. I-377-380.

Jokinen, P., et al., "A Comparison Of Approximate String Matching Algorithms", *Software—Practice and Experience*, vol. 26(12) (Dec. 1996), pp. 1439-1458.

Kobayashi, Y. & Niimi, Y., "Matching Algorithms Between A Phonetic Lattice And Two Types Of Templates—Lattice And Graph", IEEE (1985), pp. 1597-1600.

Lee, K., "Automatic Speech Recognition: The Development Of The SPHINX System", Kluwar Academic Publishers (1989), pp. 28-29.

Markowitz, Judith A., "Using Speech Recognition", Prentice Hall PTR (1996), p. 220-221.

Micca, G., et al., "Three Dimensional DP For Phonetic Lattice Matching", *Digital Signal Processing-87*, Elsevier Science Publishers B.V., North Holland (1987), pp. 547-551.

Ng, K. & Zue, V., "Phonetic Recognition For Spoken Document Retrieval", *Spoken Language Systems Group*, MIT Laboratory for Computer Science (1998), 4 pages.

Ng, K. & Zue, V., "Subword Unit Representations For Spoken Document Retrieval", *Spoken Language Systems Group*, MIT Laboratory for Computer Science (1997), 4 pages.

Ng, K., "Survey Of Approaches To Information Retrieval Of Speech Messages", *Spoken Language Systems Group*, Laboratory for Computer Science, Massachusetts Institute of Technology (Feb. 16, 1996), pp. 1-34.

Rabiner & Juang, "Fundamentals Of Speech Recognition" (1993), pp. 42-50.

Sankoff, D., et al., "Time Warps, String Edits, And Macromolecules: The Theory And Practice Of Sequence Comparison", Bell Laboratories and David Sandkoff (1983), Ch. One, pp. 1-44; Part Three, pp. 211-214; Ch. Eleven, pp. 311-318, Ch. Sixteen, pp. 359-362.

Schmid, P., et al., "Automatically Generated Word Pronunciations From Phoneme Classifier Output", *IEEE* (1993), pp. II-223-226.

Skilling, J., "Maximum Entropy And Bayesian Methods", *Fundamental Theories of Physics*, Kluwar Academic Publishers (1988), pp. 45-52.

Srinivasan, S. & Petkovic, D., "Phonetic Confusion Matrix Based Spoken Document Retrieval", *Annual International ACM SIGIR Conference on Research and Development in Information Retrieval* (Athens, Greece, Jul. 24-28, 2000), pp. 81-87.

"Template Averaging For Adapting A Dynamic Time Warping Speech Recognizer", *IBM Technical Disclosure Bulletin*, vol. 32, No. 11 (Apr. 1990), pp. 422-426.

Wechsler, M., "Spoken Document Retrieval Based On Phoneme Recognition", *Swiss Federal Institute of Technology* (Zurich, 1998), pp. 1-121.

Witbrock, M. J. & Hauptmann, A. G., "Using Words And Phonetic Strings For Efficient Information Retrieval From Imperfectly Transcribed Spoken Documents", *School of Computer Science*, Carnegie Mellon University (Jul. 23, 1997), 4 pages.

Wold, E. et al., "Content-Based Classification Search, And Retrieval Of Audio", *IEEE Multimedia* (Fall 1996), pp. 27-36.

Wright, J. H., et al., "Statistical Models For Topic Identification Using Phoneme Substrings", *IEEE* (1996), pp. 307-310.

Zobel, J. & Dart, P., "Phonetic String Matching: Lessons From Information Retrieval", *Sigir Forum, Assoc. for Computing Machinery* (New York, 1996), pp. 166-172.

Niimi, "Speech Recognition", Information Science Series E-19-3, pp. 135-186 (1979).

\* cited by examiner

Fig. 16a 210 212 214 216 218 220 222

{0.10 sec} {"NOW"} {003} {/n/} {001} {/m/} {001}

244 225 226 227

{BLOCK} {NODE} {0.10 sec} {"NOW"} {003} {/n/} {001} {NODE} {0.21 sec} {/oh/} {001} {NODE} {0.41 sec} {/w/} {001}

228 229 230

{BLOCK} {NODE} {0.52 sec} {"IS"} {002} {/ih/} {001} {NODE} {0.71 sec} {BLOCK} {/z/} {001} {NODE} {0.23 sec} {"THE"} {002} {/dh/} {001}

231 232 233 234

{NODE} {0.39 sec} {/ax/} {001} {NODE} {0.72 sec} {"WINTER"} {005} {/w/} {001} {NODE} {0.94 sec} {/i/} {001} {NODE} {1.04 sec}

248 235 236 237 238

{BLOCK} {/n/} {001} {NODE} {0.12 sec} {/t/} {001} {NODE} {0.23 sec} {/er/} {001} {NODE} {0.34 sec} {"OF"} {002} {/oh/} {002} {/oh/} {001} {NODE}

252 239 240 241 254 250

{0.47 sec} {/v/} {001} {NODE} {0.55 sec} {"OUR"} {002} {/aa/} {001} {NODE} {0.76 sec} {/r/} {001} {NODE} {0.97 sec} {BLOCK}

Fig. 16b

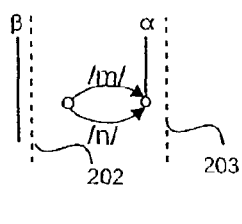
Fig. 18a
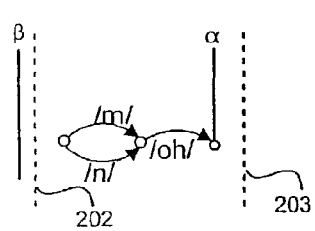
Fig. 18b
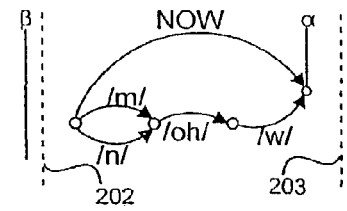
Fig. 18c
Fig. 18d
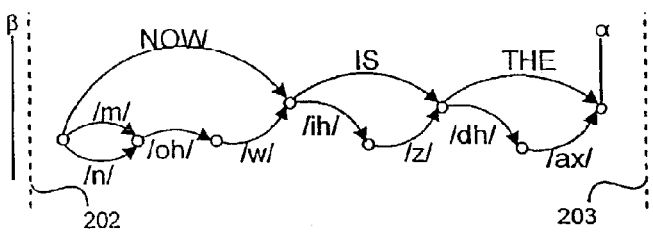
Fig. 18e-1
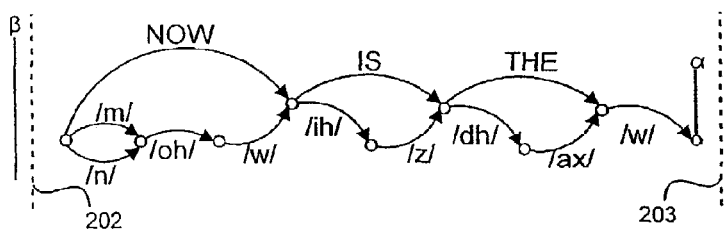
Fig. 18e-2
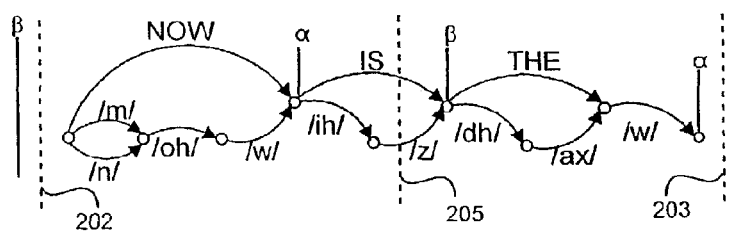
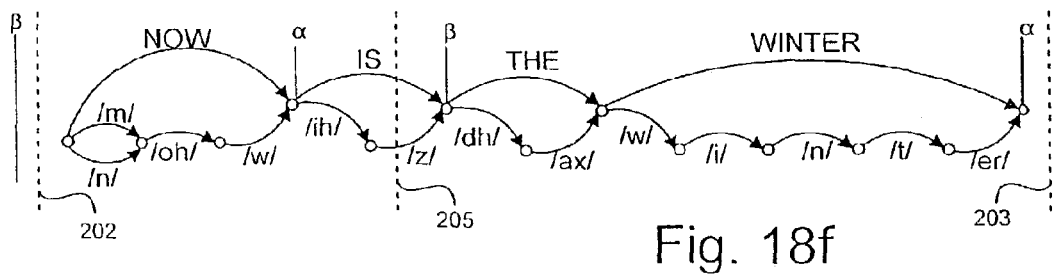
Fig. 18f

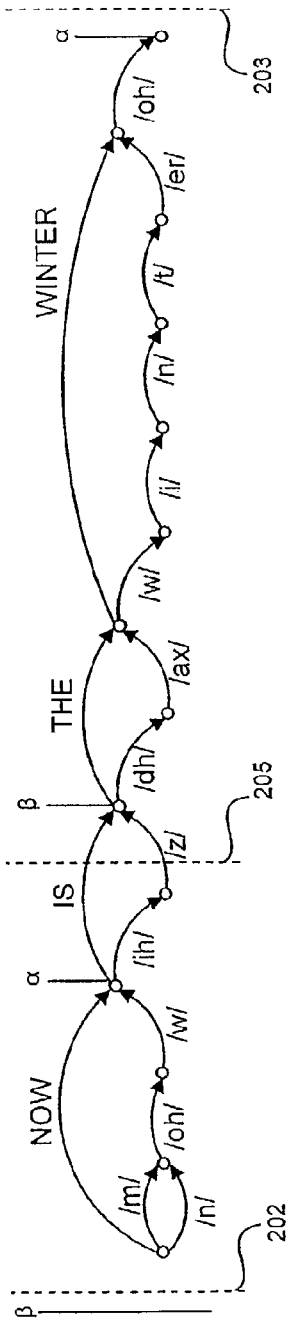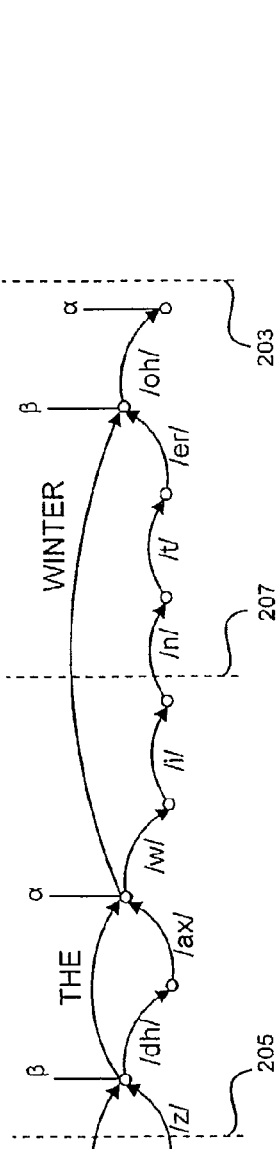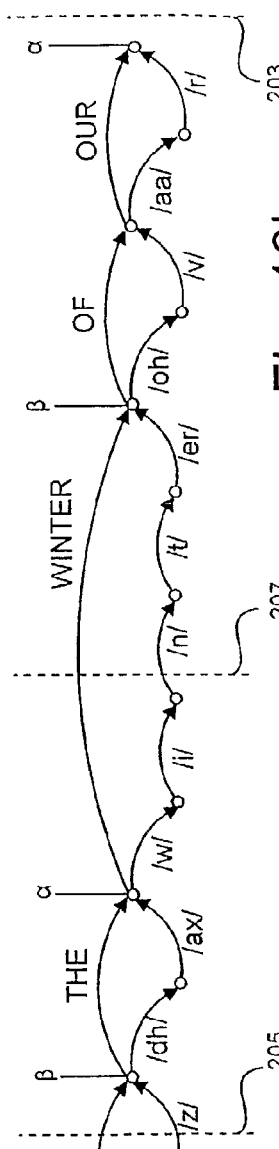
Fig. 18g-1  Fig. 18g-2  Fig. 18h

Fig. 19a {BLOCK} {NODE} {0.10 sec} {/n/} {001} {/m/} {001} {NODE} {0.21 sec} {BLOCK}
         244        260           262          264         266              245

Fig. 19b {BLOCK} {NODE} {0.10 sec} {/n/} {001} {/m/} {001} {NODE} {0.21 sec} {/oh/} {001} {NODE} {0.41 sec} {BLOCK}
                                                          268                 270                       245

Fig. 19c {BLOCK} {NODE} {0.10 sec} {"NOW"} {003} {/n/} {003} {/n/} {001} {/m/} {001} {NODE} {0.21 sec} {/oh/} {001} {NODE}
                                        276
         {0.41 sec} {/w/} {001} {NODE} {0.52 sec} {BLOCK}
           272                          274

Fig. 19d {BLOCK} {NODE} {0.10 sec} {"NOW"} {003} {/n/} {001} {/m/} {001} {NODE} {0.21 sec} {/oh/} {001} {NODE}
         {0.41 sec} {/w/} {001} {NODE} {0.52 sec} {"IS"} {002} {/ih/} {001} {NODE} {0.71 sec} {/z/} {001} {NODE} {0.94 sec}
         {"THE"} {002} {/dh/} {001} {NODE} {1.10 sec} {/ax/} {001} {NODE} {1.43 sec} {BLOCK}

Fig. 19e {BLOCK} {NODE} {0.10 sec} {"NOW"} {003} {/n/} {001} {/m/} {001} {NODE} {0.21 sec} {/oh/} {001} {NODE}
         {0.41 sec} {/w/} {001} {NODE} {0.52 sec} {"IS"} {002} {/ih/} {001} {NODE} {0.71 sec} {BLOCK} {/z/} {001} {NODE}
           304                                                                                  308         300       302
         {0.23 sec} {"THE"} {002} {/dh/} {001} {NODE} {0.39 sec} {/ax/} {001} {NODE} {0.72 sec} {NODE}
                                                        306
         {0.94 sec} {BLOCK}
                          298

Fig. 19f

{BLOCK} {NODE} {0.10 sec} {"NOW"} {003} {/n/} {001} {NODE} {0.21 sec} {/oh/} {001} {NODE}
{0.41 ec} {/w/} {001} {NODE} {0.52 sec} {"IS"} {002} {/ih/} {001} {NODE} {0.71 sec} {/z/} {001} {NODE}
{0.23 sec} {"THE"} {002} {/dh/} {001} {NODE} {0.39 sec} {/ax/} {001} {NODE} {0.72 sec} {"WINTER"} {005} {/w/}
{001} {NODE} {0.94 sec} {/i/} {001} {NODE} {1.04 sec} {/n/} {001} {NODE} {1.16 sec} {/t/} {001} {NODE} {1.27 sec}
{/er/} {001} {NODE} {1.38 sec} {BLOCK}

Fig. 19g

{BLOCK} {NODE} {0.10 sec} {"NOW"} {003} {/n/} {001} {NODE} {0.21 sec} {/oh/} {001} {NODE}
{0.41 sec} {/w/} {001} {NODE} {0.52 sec} {"IS"} {002} {/ih/} {001} {NODE} {0.71 sec} {/z/} {001} {NODE}
{0.23 sec} {"THE"} {002} {/dh/} {001} {NODE} {0.39 sec} {/ax/} {001} {NODE} {0.72 sec} {"WINTER"} {005} {/w/}
{001} {NODE} {0.94 sec} {/i/} {001} {NODE} {1.04 sec} {BLOCK} {/n/} {001} {NODE} {0.12 sec} {/t/} {001} {NODE}
{0.23 sec} {/er/} {001} {NODE} {0.34 sec} {/oh/} {001} {NODE} {0.47 sec} {BLOCK}

{BLOCK} {NODE} {0.10 sec} {"NOW"} {003} {/n/} {001} {NODE} {0.21 sec} {/oh/} {001} {NODE}
{0.41 sec} {/w/} {001} {NODE} {0.52 sec} {"IS"} {002} {/ih/} {001} {NODE} {0.71 sec} {/z/} {001} {NODE}
{0.23 sec} {"THE"} {002} {/dh/} {001} {NODE} {0.39 sec} {/ax/} {001} {NODE} {0.72 sec} {"WINTER"} {005} {/w/}
{001} {NODE} {0.94 sec} {/i/} {001} {NODE} {1.04 sec} {BLOCK} {/n/} {001} {NODE} {0.12 sec} {/t/} {001} {NODE}
{0.23 sec} {/er/} {001} {NODE} {0.34 sec} {"OF"} {002} {/oh/} {001} {NODE} {0.47 sec} {/v/} {001} {NODE}
{0.55 sec} {"OUR"} {002} {/aa/} {001} {NODE} {0.76 sec} {/r/} {001} {NODE} {0.97 sec} {BLOCK}

DATABASE ANNOTATION AND RETRIEVAL

This application is a National Stage Filing Under 35 U.S.C. 371 of International Application No. PCT/GB01/04331, filed Sep. 28, 2001, and published in English as International Publication No. WO 02/27546 A2, on Apr. 4, 2002.

The present invention relates to the annotation of data files which are to be stored in a database for facilitating their subsequent retrieval. The present invention is also concerned with a system for generating the annotation data which is added to the data file and to a system for searching the annotation data in the database to retrieve a desired data file in response to a user's input query. The invention also relates to a system for translating an unordered list of nodes and links into an ordered and blocked list of nodes and links.

Databases of information are well known and suffer from the problem of how to locate and retrieve the desired information from the database quickly and efficiently. Existing database search tools allow the user to search the database using typed keywords. Whilst this is quick and efficient, this type of searching is not suitable for various kinds of databases, such as video or audio databases.

According to one aspect, the present invention aims to provide a data structure for the annotation of data files within a database which will allow a quick and efficient search to be carried out in response to a user's input query.

According to another aspect, the present invention According to another aspect, the present invention provides data defining a phoneme and word lattice for use as annotation data for annotating data files to be stored within a database. Preferably, the data defines a plurality of nodes and a plurality of links connecting the nodes, and further data associates a plurality of phonemes with a respective plurality of links and further data associates at least one word with at least one of said links, and further data defines a block arrangement for the nodes such that the links may only extend over a given maximum number of blocks. It is further preferred that the links may only extend into a following block.

According to another aspect, the present invention provides an apparatus for searching a database which employs the annotation data discussed above for annotating data filed therein. Preferably, the apparatus is arranged to generate phoneme data in response to a user's query or input, and to search the database using the generated phoneme data. It is further preferred that word data is also generated from the user's input or query.

According to another aspect, the present invention provides an apparatus for generating a phoneme and word lattice corresponding to received phoneme and word data, comprising means for defining a plurality of links and a plurality of nodes between which the links extend, means for associating the links with phonemes or words, and means for arranging the nodes in a sequence of time ordered blocks in which the links only extend up to a maximum given number of blocks later in the sequence. Preferably, the maximum extension allowed for a link is to extend into a following block. It is further preferred that the apparatus is arranged to add nodes or links incrementally as it forms the lattice, and to split an existing block of nodes into at least two blocks of nodes.

According to another aspect, the present invention provides an apparatus for adding phonemes or words to a phoneme and word lattice of any of the types discussed above, and arranged to analyse which data defining the current phoneme and word lattice needs to be modified in dependence upon the extent to which the links are permitted to extend from one block to another. Preferably, this analysis is further dependent upon the location within the lattice of a point identifying the latest node in each block to which any link originating in the preceding block extends and a point identifying the earliest node in each block from which a link extends into the succeeding block.

According to another aspect, the present invention provides a method of adding phonemes or words to a phoneme and word lattice of any of the types discussed above, comprising analysing which data defining the current phoneme and word lattice needs to be modified in dependence upon the extent to which the links are Preferably, this analysis is further dependent upon the location within the lattice of respective points identifying the latest node in each block to which any link originating in the preceding block extends.

According to another aspect, a method and apparatus are provided for converting an unordered list of nodes and links into an ordered and blocked list of nodes and links. The blocks are formed by filling and splitting: successive nodes are inserted into a block until it is full, then a new block is begun. If new nodes would overfill an already full block, that block is split into two or more blocks. Constraints on the links regarding which block they can lead to are used to speed up the block splitting process, and identify which nodes remain in the old block and which go into the new block.

Exemplary embodiments of the present invention will now be described with reference to the accompanying figures, in which:

FIG. 3 is a block diagram illustrating one way in which FIG. 3 is a block diagram illustrating one way in which the phoneme and word annotator can generate the annotation data from an input video data file;

FIG. 16a is a schematic diagram illustrating the format of data corresponding to one node of a word and phoneme lattice;

FIG. 16b is a schematic diagram illustrating a data stream defining a word and phoneme lattice;

FIGS. 18a to 18h are schematic diagrams illustrating the build-up of a word and phoneme lattice;

FIGS. 19a to 19h are schematic diagrams illustrating the build-up of a data stream defining a word and phoneme lattice;

Embodiments of the present invention can be implemented using dedicated hardware circuits, but the embodiment to be described is implemented in computer software or code, which is run in conjunction with processing hardware such as a personal computer, work station, photocopier, facsimile machine, personal digital assistant (PDA) or the like.

Figure 1:
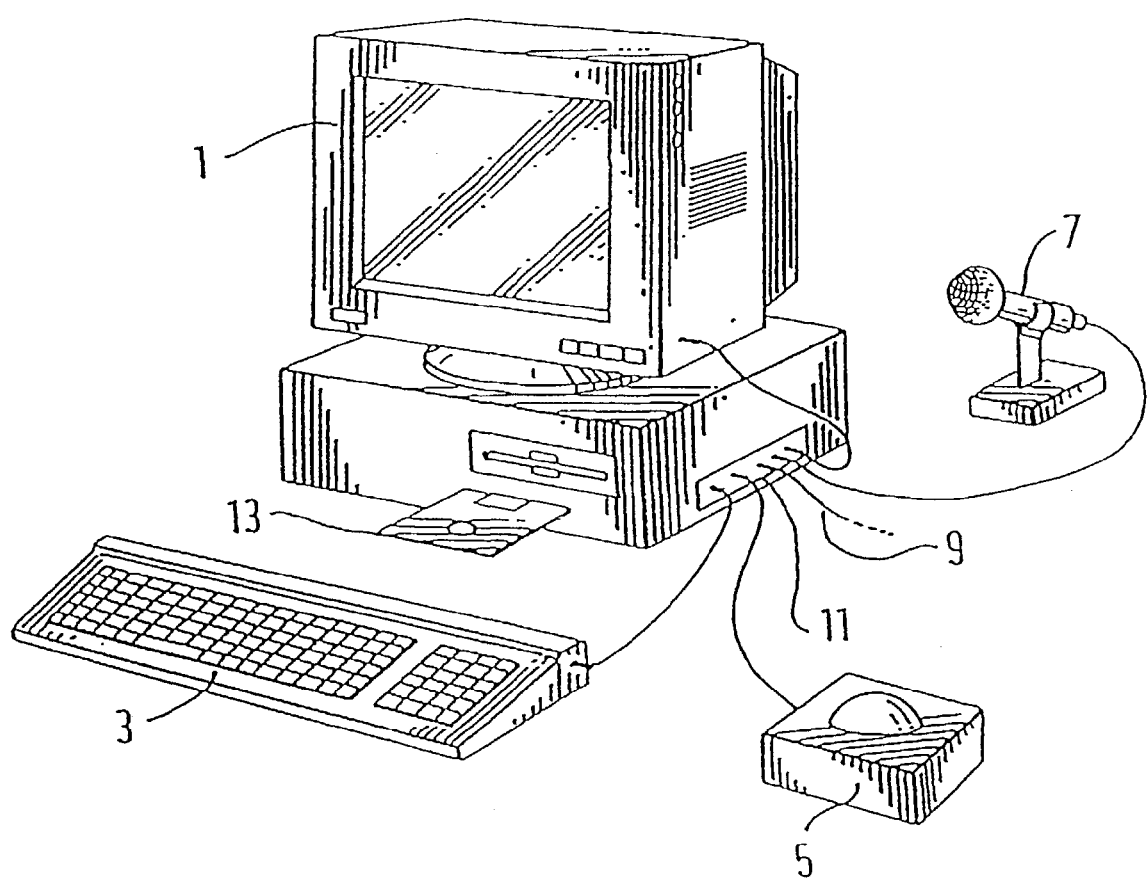
FIG. 1 is a schematic view of a computer which is programmed to operate an embodiment of the present invention.

FIG. 1 shows a personal computer (PC) 1 which is programmed to operate an embodiment of the present invention. A keyboard 3, a pointing device 5, a microphone 7 and a telephone line 9 are connected to the PC 1 via an interface 11. The keyboard 3 and pointing device 5 enable the system to be controlled by a user. The microphone 7 converts acoustic speech signals from the user into equivalent electrical signals and supplies them to the PC 1 for processing. An internal modem and speech receiving circuit (not shown) is connected to the telephone line 9 so that the PC 1 can communicate with, for example, a remote computer or with a remote user.

The programme instructions which make the PC 1 operate in accordance with the present invention may be supplied for use with an existing PC 1 on, for example, a storage device such as a magnetic disc 13, or by downloading the software from the Internet (not shown) via the internal modem and telephone line 9.

Data File Annotation

Figure 2:
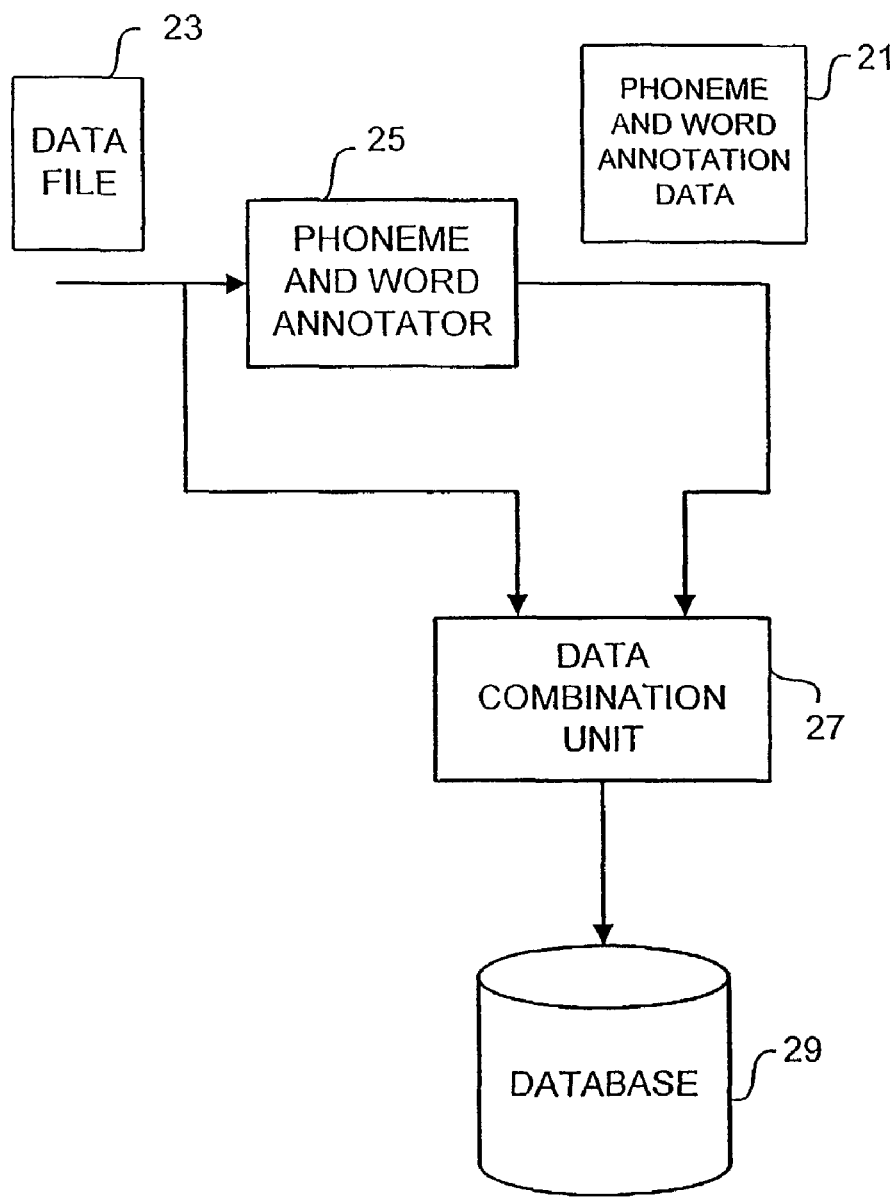
FIG. 2 is a block diagram showing a phoneme and word annotator unit which is operable to generate phoneme and word annotation data for appendage to a data file.

FIG. 2 is a block diagram illustrating the way in which annotation data 21 for an input data file 23 is generated in this embodiment by a phoneme and word annotating unit 25. As shown, the generated phoneme and word annotation data 21 is then combined with the data file 23 in the data combination unit 27 and the combined data file output thereby is input to the database 29. In this embodiment, the annotation data 21 comprises a combined phoneme (or phoneme like) and word lattice which allows the user to retrieve information from the database by a voice query. As those skilled in the art will appreciate, the data file 23 can be any kind of data file, such as, a video file, an audio file, a multimedia file etc.

A system has been proposed to generate N-Best word lists for an audio stream as annotation data by passing the audio data from a video data file through an automatic speech recognition unit. However, such word-based systems suffer from a number of problems. These include (i) that state of the art speech recognition systems still make basic mistakes in recognition; (ii) that state of the art automatic speech recognition systems use a dictionary of perhaps 20,000 to 100,000 words and cannot produce words outside that vocabulary; and (iii) that the production of N-Best lists grows exponentially with the number of hypothesis at each stage, therefore resulting in the annotation data becoming prohibitively large for long utterances.

The first of these problems may not be that significant if the same automatic speech recognition system is used to generate the annotation data and to subsequently retrieve the corresponding data file, since the same decoding error could occur. However, with advances in automatic speech recognition systems being made each year, it is likely that in the future the same type of error may not occur, resulting in the inability to be able to retrieve the corresponding data file at that later date. With regard to the second problem, this is particularly significant in video data applications, since users are likely to use names and places (which may not be in the speech recognition dictionary) as input query terms. In place of these names, the automatic speech recognition system will typically replace the out of vocabulary words with a phonetically similar word or words within the vocabulary, often corrupting nearby decodings. This can also result in the failure to retrieve the required data file upon subsequent request.

In contrast, with the proposed phoneme and word lattice annotation data, a quick and efficient search using the word data in the database 29 can be carried out and, if this fails to provide the required data file, then a further search using the more robust phoneme data can be performed. The phoneme and word lattice is an acyclic directed graph with a single entry point and a single exit point. It represents different parses of the audio stream within the data file. It is not simply a sequence of words with alternatives since each word does not have to be replaced by a single alternative, one word can be substituted for two or more words or phonemes, and the whole structure can form a substitution for one or more words or phonemes. Therefore, the density of data within the phoneme and word lattice essentially remains linear throughout the audio data, rather than growing exponentially as in the case of the N-Best technique discussed above. As those skilled in the art of speech recognition will realise, the use of phoneme data is more robust, because phonemes are dictionary independent and allow the system to cope with out of vocabulary words, such as names, places, foreign words etc. The use of phoneme data is also capable of making the system future proof, since it allows data files which are placed into the database to be retrieved even when the words were not understood by the original automatic speech recognition system.

The way in which this phoneme and word lattice annotation data can be generated for a video data file will now be described with reference to FIG. 3. As shown, the video data file 31 comprises video data 31-1, which defines the sequence of images forming the video sequence and audio data 31-2, which defines the audio which is associated with the video sequence. As is well known, the audio data 31-2 is time synchronised with the video data 31-1 so that, in use, both the video and audio data are supplied to the user at the same time.

Figure 3:
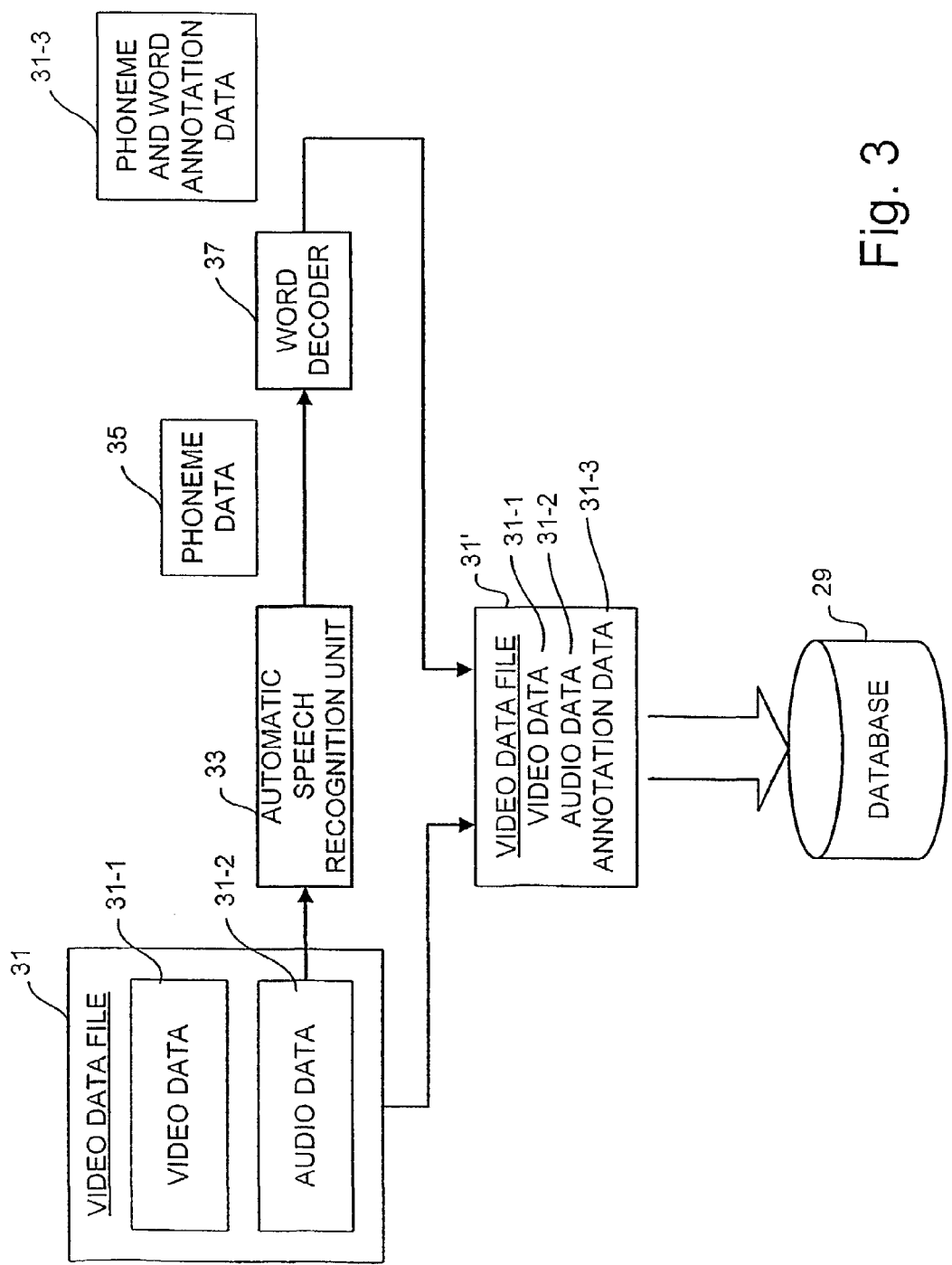

As shown in FIG. 3, in this embodiment, the audio data 31-2 is input to an automatic speech recognition unit 33, which is operable to generate a phoneme lattice corresponding to the stream of audio data 31-2. Such an automatic speech recognition unit 33 is commonly available in the art and will not be described in further detail. The reader is referred to, for example, the book entitled 'Fundamentals of Speech Recognition' by Lawrence Rabiner and Biing-Hwang Juang and, in particular, to pages 42 to 50 thereof, for further information on this type of speech recognition system.

Figure 4A:
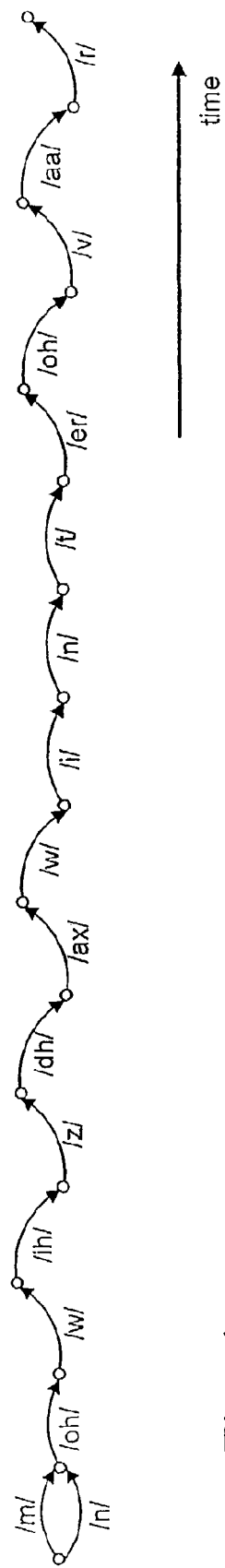
FIG. 4a is a schematic diagram of a phoneme lattice for an example audio string from the input video data file.

FIG. 4a illustrates the form of the phoneme lattice data output by the speech recognition unit 33, for the input audio corresponding to the phrase '. . . now is the winter of our . . . '. The automatic speech recognition unit 33 identifies a number of different possible phoneme strings which correspond to this input audio utterance. For example, the speech recognition system considers that the first phoneme in the audio string is either an /m/ or an /n/. For clarity, only the alternatives for the first phoneme are shown. As is well known in the art of speech recognition, these different possibilities can have their own weighting which is generated by the speech recognition unit 33 and is indicative of the confidence of the speech recognition unit's output. For example, the phoneme /n/ may be given a weighting of 0.9 and the phoneme /m/ may be given a weighting of 0.1, indicating that the speech recognition system is fairly confident that the corresponding portion of audio represents the phoneme /n/, but that it still may be the phoneme /m/.

In this embodiment, however, this weighting of the phonemes is not performed.

Figure 4B:
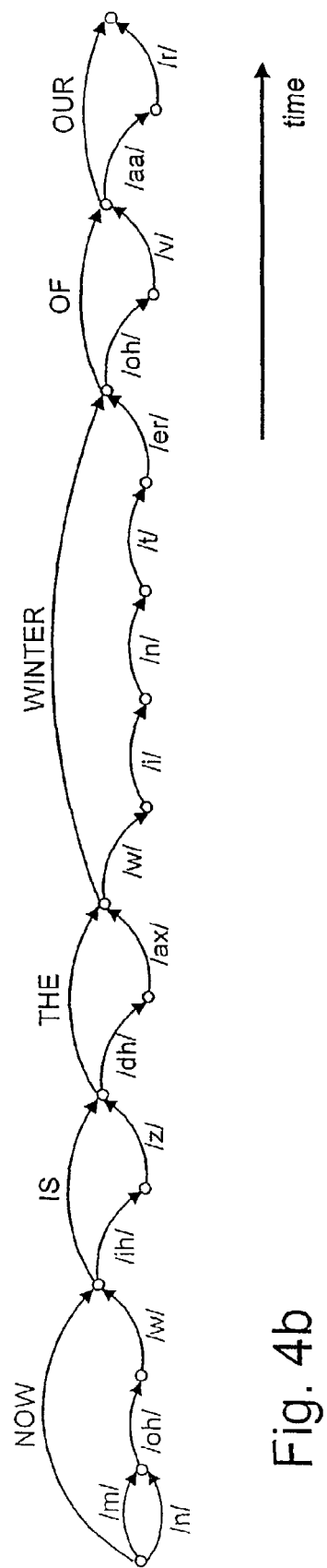
FIG. 4b is a schematic diagram of a word and phoneme lattice embodying one aspect of the present invention, for an example audio string from the input video data file.

As shown in FIG. 3, the phoneme lattice data 35 output by the automatic speech recognition unit 33 is input to a word decoder 37 which is operable to identify possible words within the phoneme lattice data 35. In this embodiment, the words identified by the word decoder 37 are incorporated into the phoneme lattice data structure. For example, for the phoneme lattice shown in FIG. 4a, the word decoder 37 identifies the words "NOW", "IS", "THE", "WINTER", "OF" and "OUR". As shown in FIG. 4b, these identified words are added to the phoneme lattice data structure output by the speech recognition unit 33, to generate a phoneme and word lattice data structure which forms the annotation data 31-3. This annotation data 31-3 is then combined with the video data file 31 to generate an augmented video data file 31' which is then stored in the database 29. As those skilled in the art will appreciate, in a similar way to the way in which the audio data 31-2 is time synchronised with the video data 31-1, the annotation data 31-3 is also time synchronised and associated with the corresponding video data 31-1 and audio data 31-2, so that a desired portion of the video and audio data can be retrieved by searching for and locating the corresponding portion of the annotation data 31-3.

In this embodiment, the annotation data 31-3 stored in the database 29 has the following general form:
Header
   time of start
   flag if word if phoneme if mixed
  time index associating the location of blocks of annotation data within memory to a given time point.
   word set used (i.e. the dictionary)
   phoneme set used
   phoneme probability data
   the language to which the vocabulary pertains
Block(i) i=0,1,2, . . .
  node $N_j$ j=0,1,2, . . .
   time offset of node from start of block
   phoneme links (k) k=0,1,2 . . . offset to node $N_i=N_k-N_j$ ($N_k$ is node to which link K extends) or if $N_k$ is in block (i+1) offset to node $N_j=N_k+N_b-N_j$ (where $N_b$ is the number of nodes in block (i)) phoneme associated with link (k)
   word links (l) l=0,1,2 . . . offset to node $N_j=N_i-N_j$ ($N_j$ is node to which link l extends) or if $N_k$ is in block (i+1) offset to node $N_j=N_k+N_b-N_j$ (where $N_b$ is the number of nodes in block (i)) word associated with link (l)

The time of start data in the header can identify the time and date of transmission of the data. For example, if the video file is a news broadcast, then the time of start may include the exact time of the broadcast and the date on which it was broadcast.

The flag identifying if the annotation data is word annotation data, phoneme annotation data or if it is mixed is provided since not all the data files within the database will include the combined phoneme and word lattice annotation data discussed above, and in this case, a different search strategy would be used to search this annotation data.

In this embodiment, the annotation data is divided into blocks in order to allow the search to jump into the middle of the annotation data for a given audio data stream. The header therefore includes a time index which associates the location of the blocks of annotation data within the memory to a given time offset between the time of start and the time corresponding to the beginning of the block.

The header also includes data defining the word set used (i.e. the dictionary), the phoneme set used and the language to which the vocabulary pertains. The header may also include details of the automatic speech recognition system used to generate the annotation data and any appropriate settings thereof which were used during the generation of the annotation data.

The phoneme probability data defines the probability of insertions, deletions, misrecognitions and decodings for the system, such as an automatic speech recognition system, which generated the annotation data.

The blocks of annotation data then follow the header and identify, for each node in the block, the time offset of the node from the start of the block, the phoneme links which connect that node to other nodes by phonemes and word links which connect that node to other nodes by words. Each phoneme link and word link identifies the phoneme or word which is associated with the link. They also identify the offset to the current node. For example, if node $N_{50}$ is linked to node $N_{55}$ by a phoneme link, then the offset to node $N_{50}$ is 5. As those skilled in the art will appreciate, using an offset indication like this allows the division of the continuous annotation data into separate blocks.

In an embodiment where an automatic speech recognition unit outputs weightings indicative of the confidence of the speech recognition units output, these weightings or confidence scores would also be included within the data structure. In particular, a confidence score would be provided for each node which is indicative of the confidence of arriving at the node and each of the phoneme and word links would include a transition score depending upon the weighting given to the corresponding phoneme or word. These weightings would then be used to control the search and retrieval of the data files by discarding those matches which have a low confidence score.

Data File Retrieval

Figure 5:
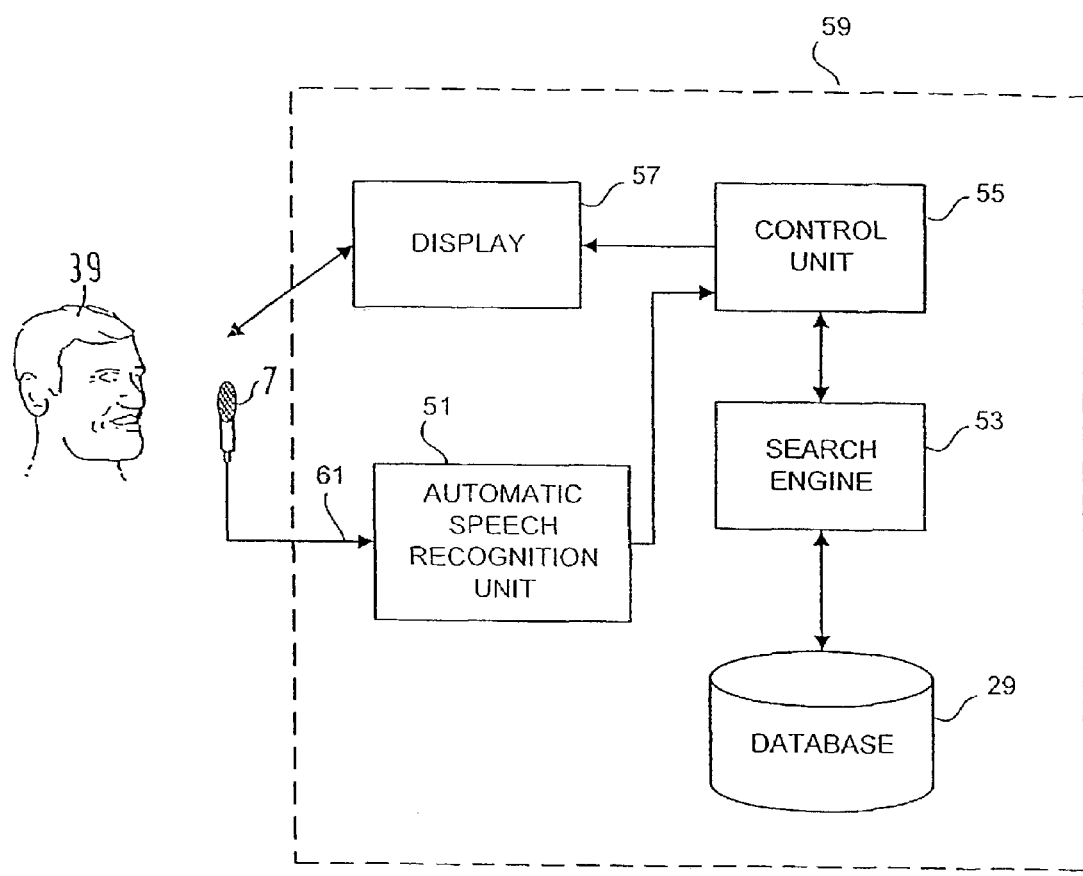
FIG. 5 is a schematic block diagram of a user's terminal which allows the user to retrieve information from the database by a voice query.

FIG. 5 is a block diagram illustrating the form of a user terminal 59 which can be used to retrieve the annotated data files from the database 29. This user terminal 59 may be, for example, a personal computer, hand held device or the like. As shown, in this embodiment, the user terminal 59 comprises the database 29 of annotated data files, an automatic speech recognition unit 51, a search engine 53, a control unit 55 and a display 57. In operation, the automatic speech recognition unit 51 is operable to process an input voice query from the user 39 received via the microphone 7 and the input line 61 and to generate therefrom corresponding phoneme and word data. This data may also take the form of a phoneme and word lattice, but this is not essential. This phoneme and word data is then input to the control unit 55 which is operable to initiate an appropriate search of the database 29 using the search engine 53. The results of the search, generated by the search engine 53, are then transmitted back to the control unit 55 which analyses the search results and generates and displays appropriate display data to the user via the display 57. More details of the search techniques which can be performed are given in co-pending applications PCT/GB00/00718 and GB9925561.4, the contents of which are incorporated herein by reference.

ALTERNATIVE EMBODIMENTS

As those skilled in the art will appreciate, this type of phonetic and word annotation of data files in a database provides a convenient and powerful way to allow a user to search the database by voice. In the illustrated embodiment, a single audio data stream was annotated and stored in the database for subsequent retrieval by the user. As those skilled in the art will appreciate, when the input data file corresponds to a video data file, the audio data within the data file will usually include audio data for different speakers. Instead of generating a single stream of annotation data for the audio data, separate phoneme and word lattice annotation data can be generated for the audio data of each speaker. This may be achieved by identifying, from the pitch or from another distinguishing feature of the speech signals, the audio data which corresponds to each of the speakers and then by annotating the different speaker's audio separately. This may also be achieved if the audio data was recorded in stereo or if an array of microphones were used in generating the audio data, since it is then possible to process the audio data to extract the data for each speaker.

Figure 6:
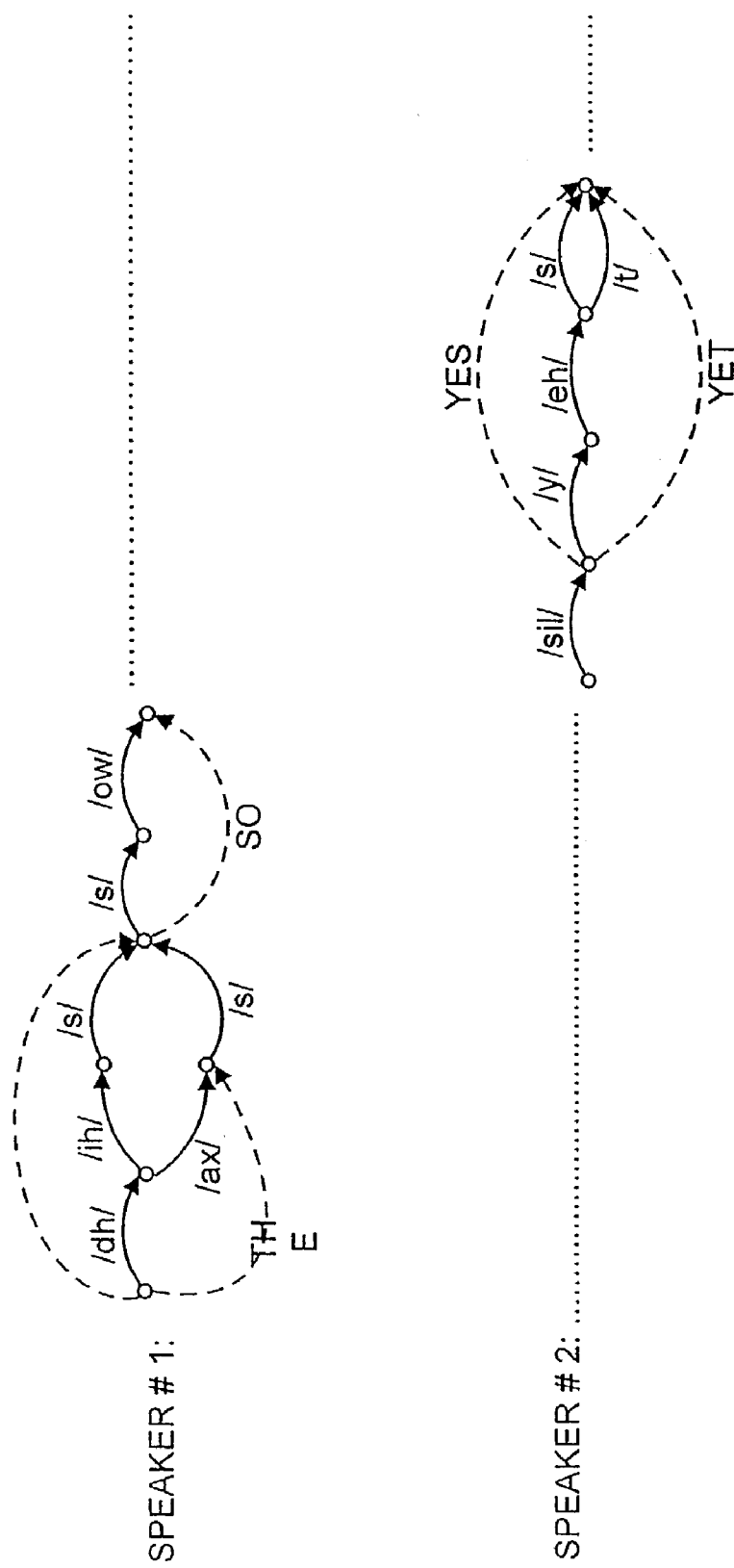
FIG. 6 is a schematic diagram of a pair of word and phoneme lattices, for example audio strings from two speakers.

FIG. 6 illustrates the form of the annotation data in such an embodiment, where a first speaker utters the words ". . . this so" and the second speaker replies "yes". As illustrated, the annotation data for the different speakers' audio data are-time synchronised, relative to each other, so that the annotation data is still time synchronised to the video and audio data within the data file. In such an embodiment, the header information in the data structure should preferably include a list of the different speakers within the annotation data and, for each speaker, data defining that speaker's language, accent, dialect and phonetic set, and each block should identify those speakers that are active in the block.

In the above embodiments, a speech recognition system was used to generate the annotation data for annotating a data file in the database. As those skilled in the art will appreciate, other techniques can be used to generate this annotation data. For example, a human operator can listen to the audio data and generate a phonetic and word transcription to thereby manually generate the annotation data.

Figure 7:
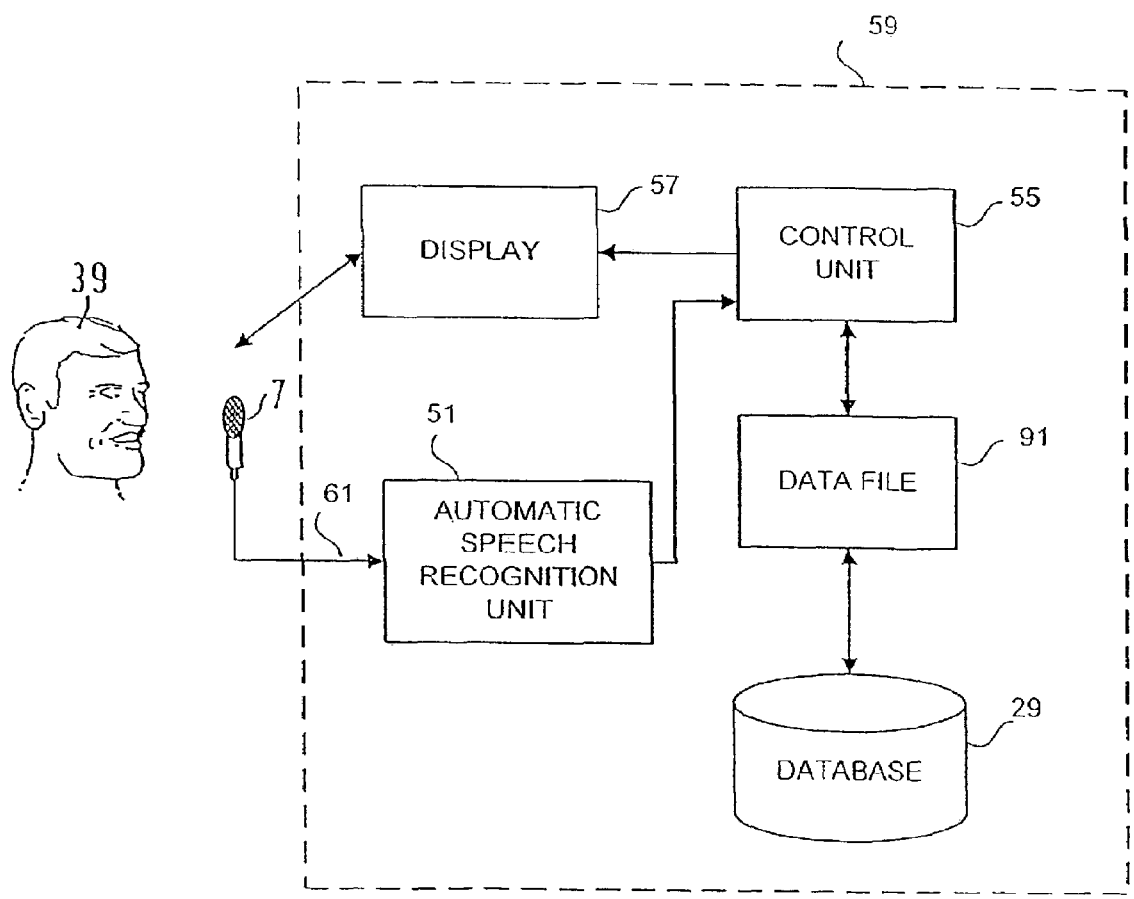
FIG. 7 is a schematic block diagram illustrating a user terminal which allows the annotation of a data file with annotation data generated from an audio signal input from a user.

In the above embodiments, the annotation data was generated from audio stored in the data file itself. As those skilled in the art will appreciate, other techniques can be used to input the annotation data. FIG. 7 illustrates the form of a user terminal 59 which allows a user to input voice annotation data via the microphone 7 for annotating a data file 91 which is to be stored in the database 29. In this embodiment, the data file 91 comprises a two dimensional image generated by, for example, a camera. The user terminal 59 allows the user 39 to annotate the 2D image with an appropriate annotation which can be used subsequently for retrieving the 2D image from the database 29. In this embodiment, the input voice annotation signal is converted, by the automatic speech recognition unit 51, into phoneme and word lattice annotation data which is passed to the control unit 55. In response to the user's input, the control unit 55 retrieves the appropriate 2D file from the database 29 and appends the phoneme and word annotation data to the data file 91. The augmented data file is then returned to the database 29. During this annotating step, the control unit 55 is operable to display the 2D image on the display 57 so that the user can ensure that the annotation data is associated with the correct data file 91.

Figure 8:
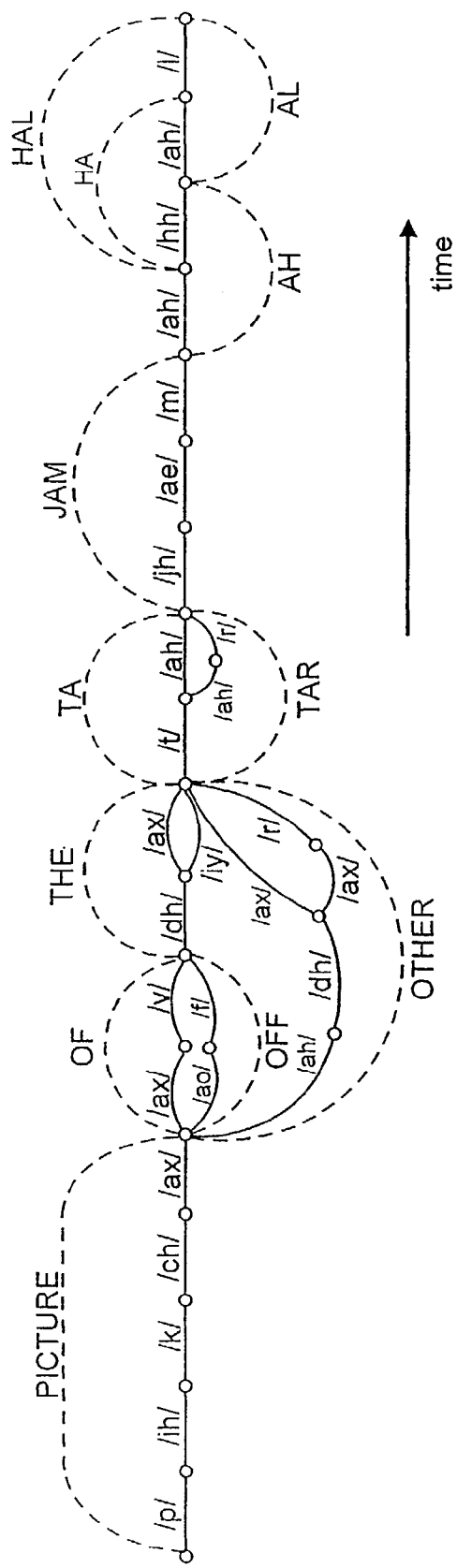
FIG. 8 is a schematic diagram of phoneme and word lattice annotation data which is generated for an example utterance input by the user for annotating a data file.

The automatic speech recognition unit 51 generates the phoneme and word lattice annotation data by (i) generating a phoneme lattice for the input utterance; (ii) then identifying words within the phoneme lattice; and (iii) finally by combining the two. FIG. 8 illustrates the form of the phoneme and word lattice annotation data generated for the input utterance "picture of the Taj-Mahal". As shown, the automatic speech recognition unit identifies a number of different possible phoneme strings which correspond to this input utterance. As shown in FIG. 8, the words which the automatic speech recognition unit 51 identifies within the phoneme lattice are incorporated into the phoneme lattice data structure. As shown, for the example phrase, the automatic speech recognition unit 51 identifies the words "picture", "of", "off", "the", "other", "ta", "tar", "jam", "ah", "hal", "ha" and "al". The control unit 55 is then operable to add this annotation data to the 2D image data file 91 which is then stored in a database 29.

As those skilled in the art will appreciate, this embodiment can be used to annotate any kind of image such as x-rays of patients, 3D videos of, for example, NMR scans, ultrasound scans etc. It can also be used to annotate one-dimensional data, such as audio data or seismic data.

Figure 9:
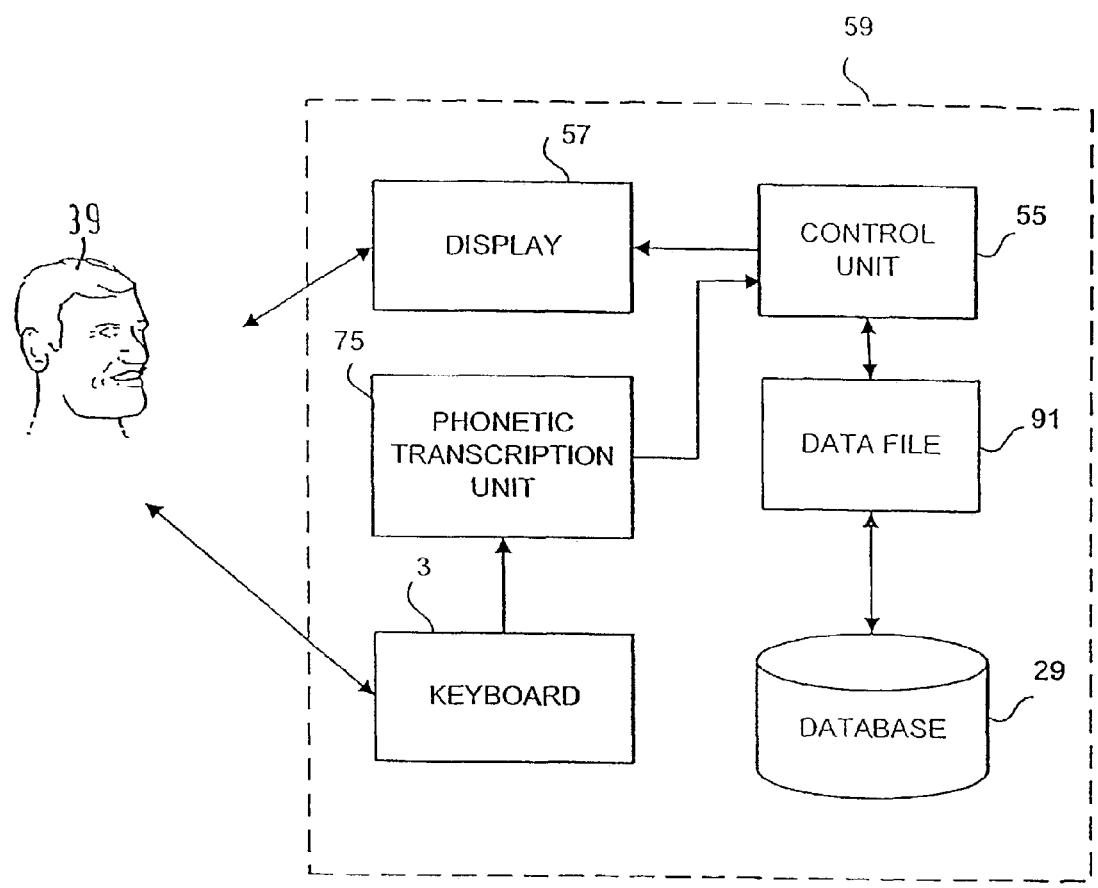
FIG. 9 is a schematic block diagram illustrating a user terminal which allows the annotation of a data file with annotation data generated from a typed input from a user.

In the above embodiment, a data file was annotated from a voiced annotation. As those skilled in the art will appreciate, other techniques can be used to input the annotation. For example, FIG. 9 illustrates the form of a user terminal 59 which allows a user to input typed annotation data via the keyboard 3 for annotating a data file 91 which is to be stored in a database 29. In this embodiment, the typed input is converted, by the phonetic transcription unit 75, into the phoneme and word lattice annotation data (using an internal phonetic dictionary (not shown)) which is passed to the control unit 55. In response to the user's input, the control unit 55 retrieves the appropriate 2D file from the database 29 and appends the phoneme and word annotation data to the data file 91. The augmented data file is then returned to the database 29. During this annotating step, the control unit 55 is operable to display the 2D image on the display 57 so that the user can ensure that the annotation data is associated with the correct data file 91.

Figure 10:
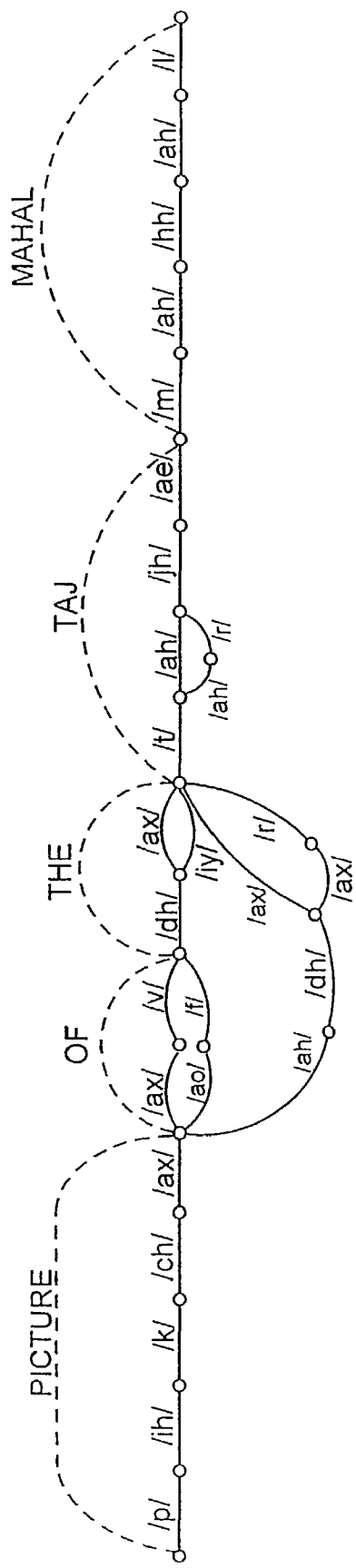
FIG. 10 is a schematic diagram of phoneme and word lattice annotation data which is generated for a typed input by the user for annotating a data file.

FIG. 10 illustrates the form of the phoneme and word lattice annotation data generated for the input utterance "picture of the Taj-Mahal". As shown in FIG. 2, the phoneme and word lattice is an acyclic directed graph with a single entry point and a single exit point. It represents different parses of the user's input. As shown, the phonetic transcription unit 75 identifies a number of different possible phoneme strings which correspond to the typed input.

Figure 11:
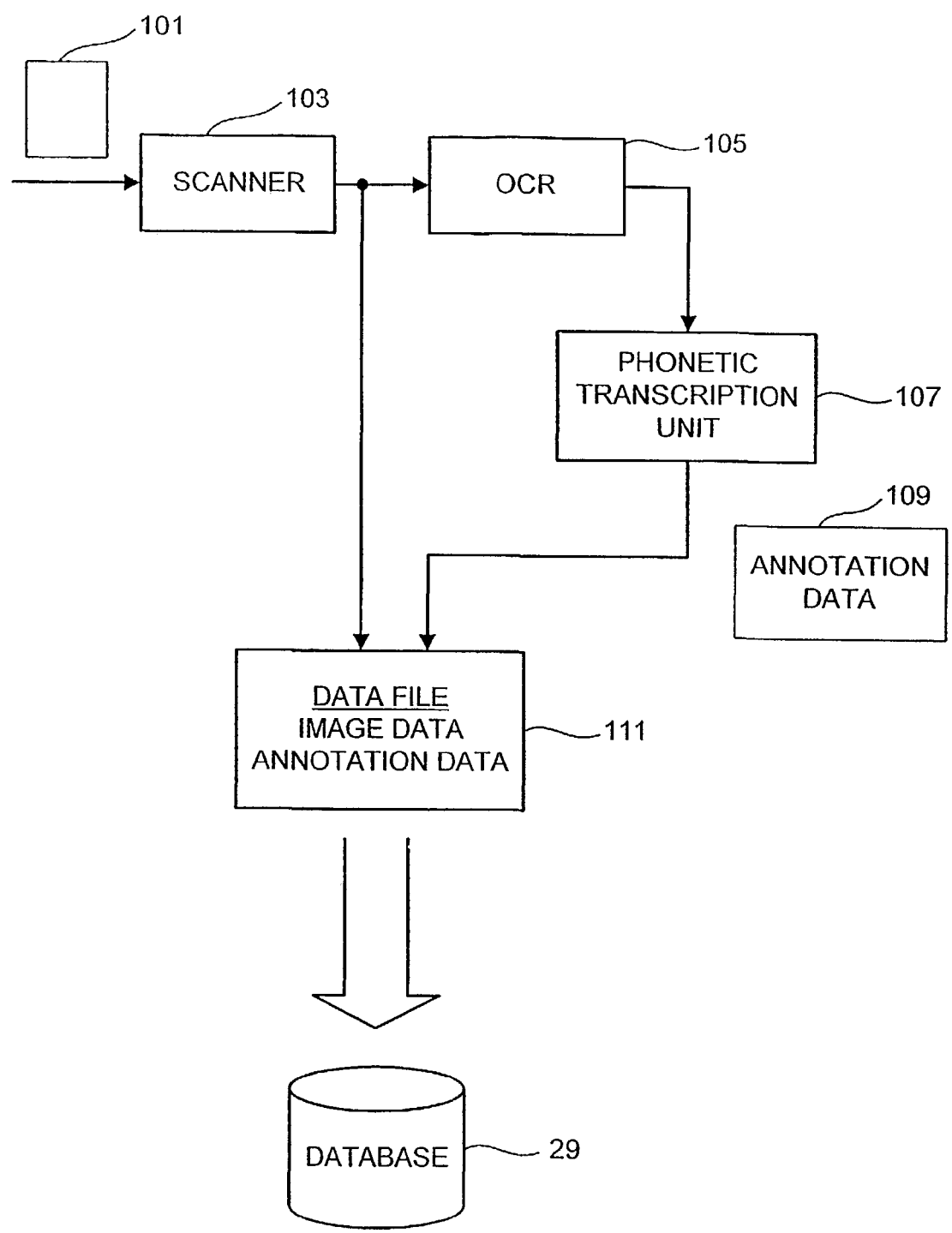
FIG. 11 is a block schematic diagram showing the form of a document annotation system.

FIG. 11 is a block diagram illustrating a document annotation system. In particular, as shown in FIG. 11, a text document 101 is converted into an image data file by a document scanner 103. The image data file is then passed to an optical character recognition (OCR) unit 105 which converts the image data of the document 101 into electronic text. This electronic text is then supplied to a phonetic transcription unit 107 which is operable to generate phoneme and word annotation data 109 which is then appended to the image data output by the scanner 103 to form a data file 111. As shown, the data file 111 is then stored in the database 29 for subsequent retrieval. In this embodiment, the annotation data 109 comprises the combined phoneme and word lattice described above which allows the user to subsequently retrieve the data file 111 from the database 29 by a voice query.

Figure 12:
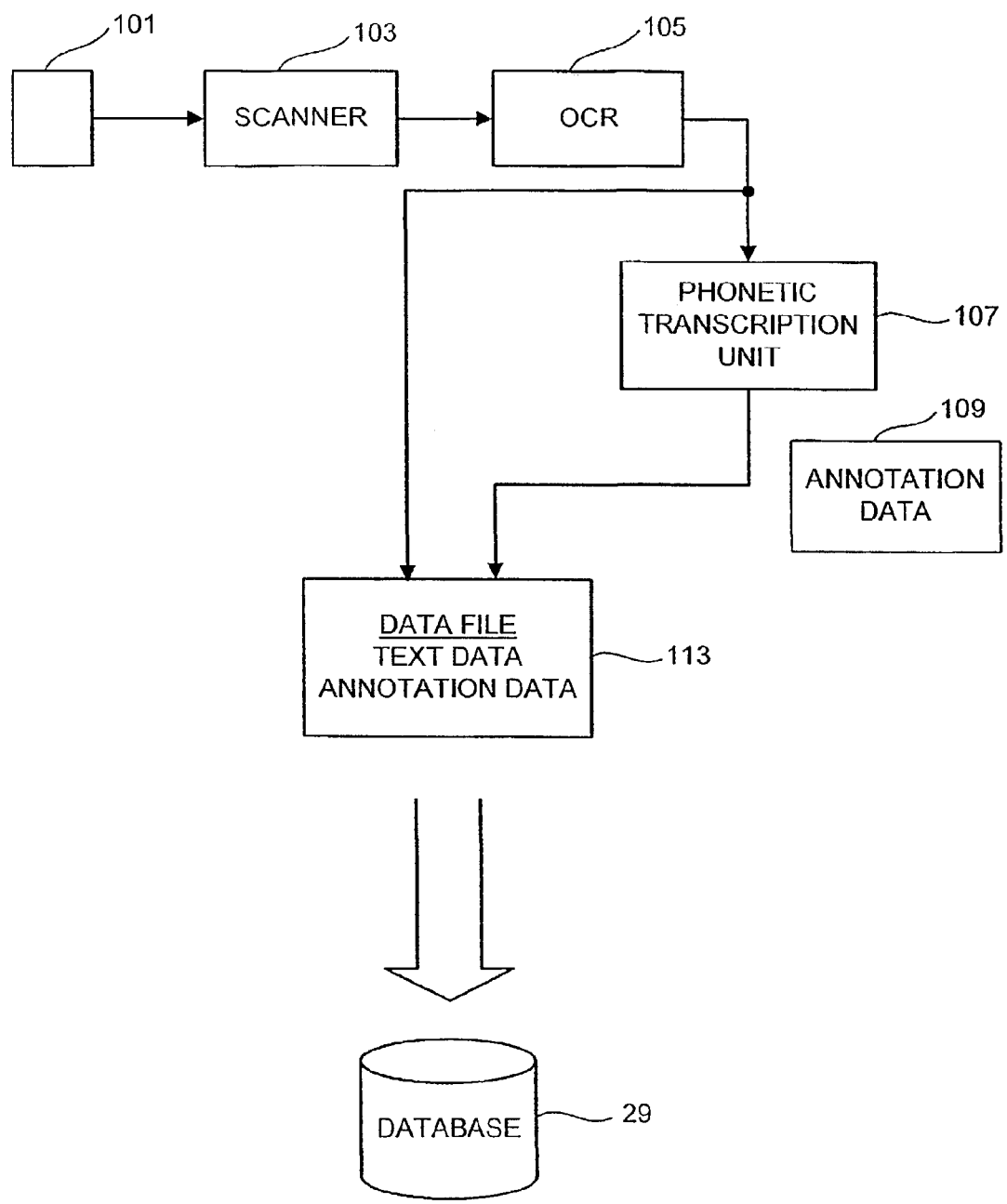
FIG. 12 is a block schematic diagram of an alternative document annotation system.

FIG. 12 illustrates a modification to the document annotation system shown in FIG. 15. The difference between the system shown in FIG. 16 and the system shown in FIG. 11 is that the output of the optical character recognition unit 105 is used to generate the data file 113, rather than the image data output by the scanner 103. The rest of the system shown in FIG. 12 is the same as that shown in FIG. 11 and will not be described further.

Figure 13:
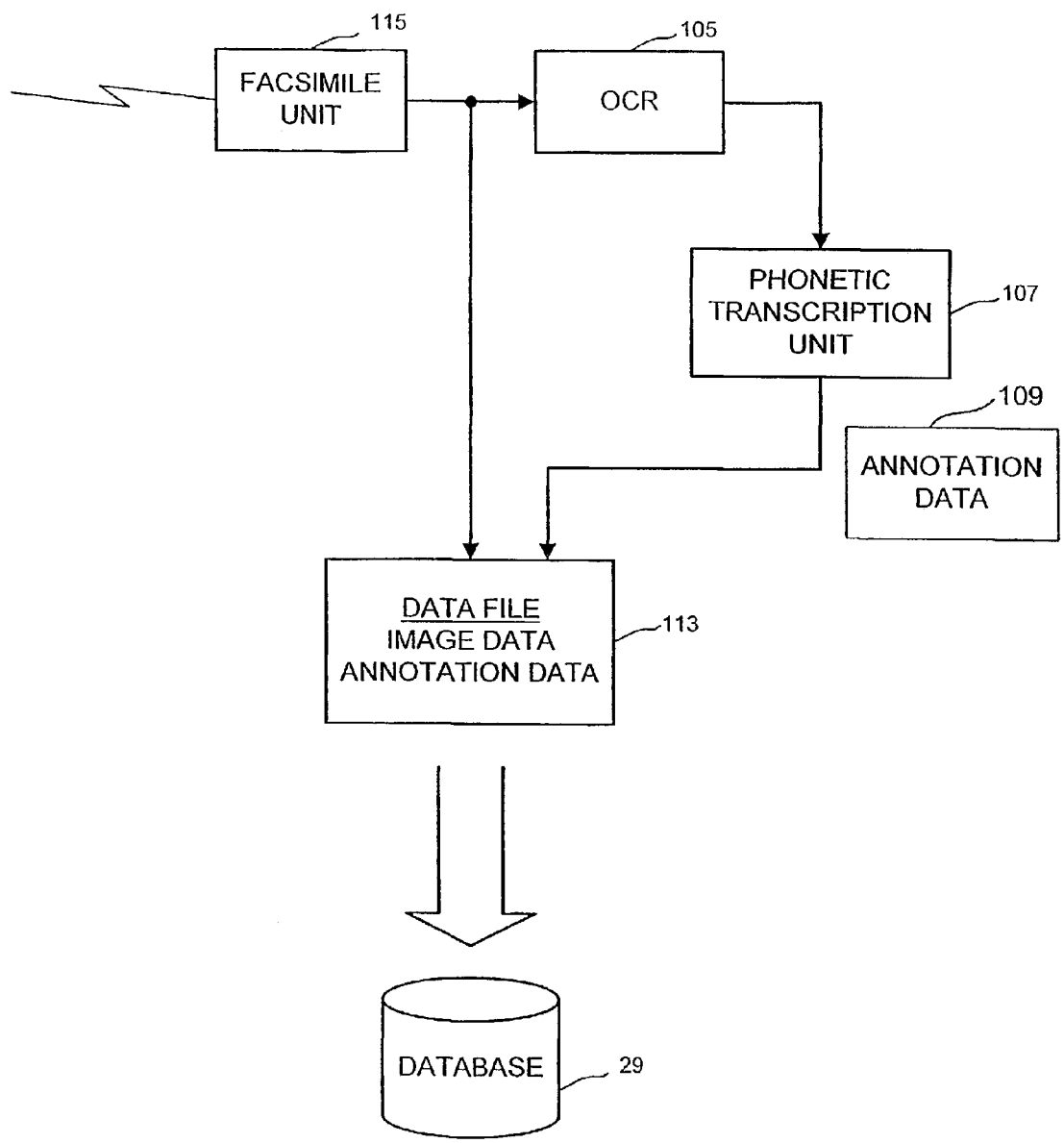
FIG. 13 is a block schematic diagram of another document annotation system.

FIG. 13 shows a further modification to the document annotation system shown in FIG. 11. In the embodiment shown in FIG. 13, the input document is received by a facsimile unit 115 rather than a scanner 103. The image data output by the facsimile unit is then processed in the same manner as the image data output by the scanner 103 shown in FIG. 11, and will not be described again.

In the above embodiment, a phonetic transcription unit 107 was used for generating the annotation data for annotating the image or text data. As those skilled in the art will appreciate, other techniques can be used. For example, a human operator can manually generate this annotation data from the image of the document itself.

Figure 14:
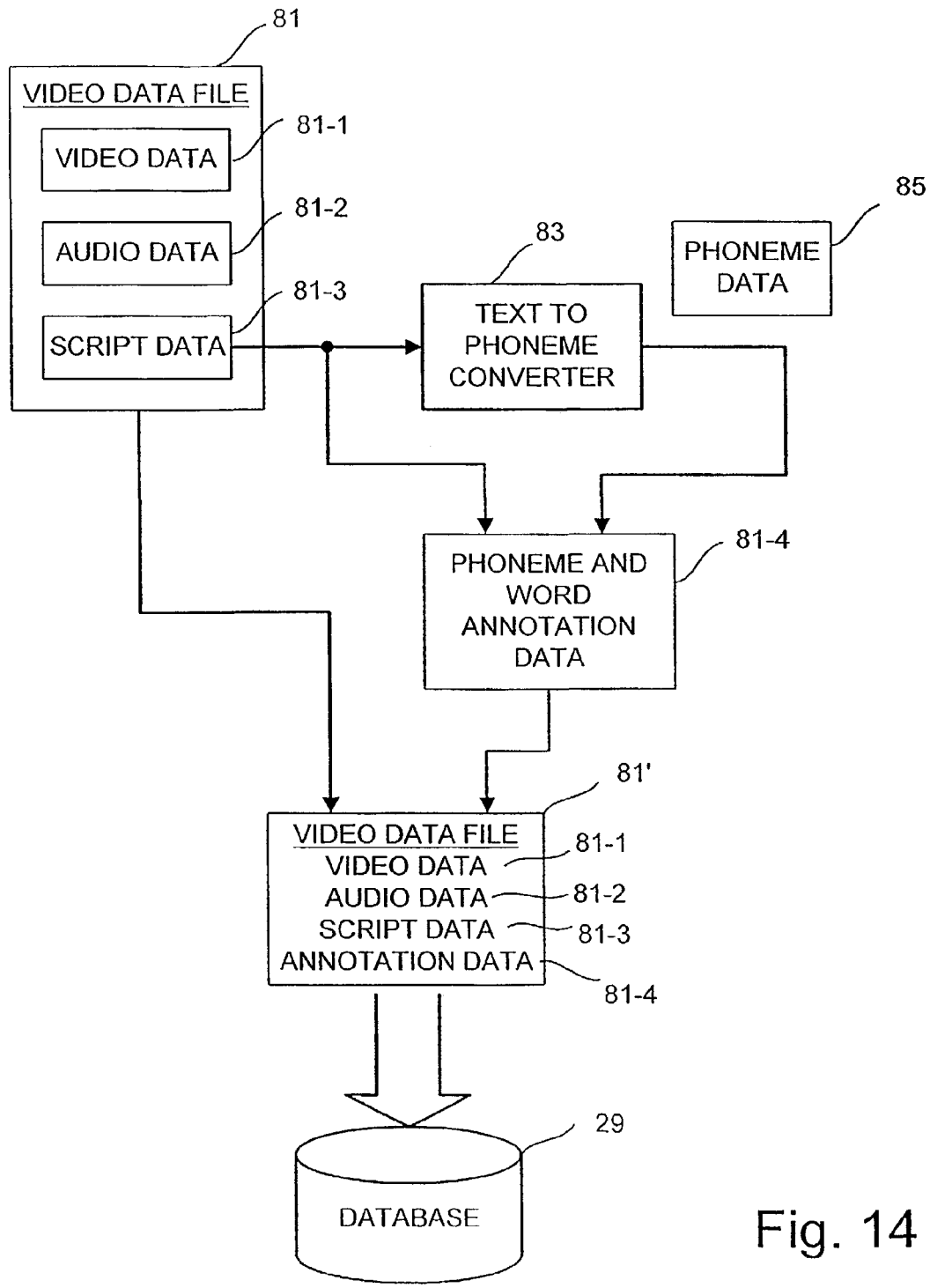
FIG. 14 is a schematic block diagram illustrating the way in which a phoneme and word lattice can be generated from script data contained within a video data file.

In the first embodiment, the audio data from the data file 31 was passed through an automatic speech recognition unit in order the generate the phoneme annotation data. In some situations, a transcript of the audio data will be present in the data file. Such an embodiment is illustrated in FIG. 14. In this embodiment, the data file 81 represents a digital video file having video data 81-1, audio data 81-2 and script data 81-3 which defines the lines for the various actors in the video film. As shown, the script data 81-3 is passed through a text to phoneme converter 83, which generates phoneme lattice data 85 using a stored dictionary which translates words into possible sequences of phonemes. This phoneme lattice data 85 is then combined with the script data 81-3 to generate the above described phoneme and word lattice annotation data 81-4. This annotation data is then added to the data file 81 to generate an augmented data file 81' which is then added to the database 29. As those skilled in the art will appreciate, this embodiment facilitates the generation of separate phoneme and word lattice annotation data for the different speakers within the video data file, since the script data usually contains indications of who is talking. The synchronisation of the phoneme and word lattice annotation data with the video and audio data can then be achieved by performing a forced time alignment of the script data with the audio data using an automatic speech recognition system (not shown).

In the above embodiments, a phoneme (or phoneme-like) and word lattice was used to annotate a data file. As those skilled in the art of speech recognition and speech processing will realise, the word "phoneme" in the description and claims is not limited to its linguistic meaning but includes the various sub-word units that are identified and used in standard speech recognition systems, such as phonemes, syllables, Katakana (Japanese alphabet) etc.

Lattice Generation

In the above description, generation of the phoneme and word lattice data structure shown in FIG. 4b was described with reference to FIG. 3. A preferred form of that data structure, including a preferred division of the nodes into blocks, will now be described with reference to FIGS. 15 to 17. Thereafter, one way of generating the preferred data structure will be described with reference to FIGS. 18 to 22.

Figure 15A:
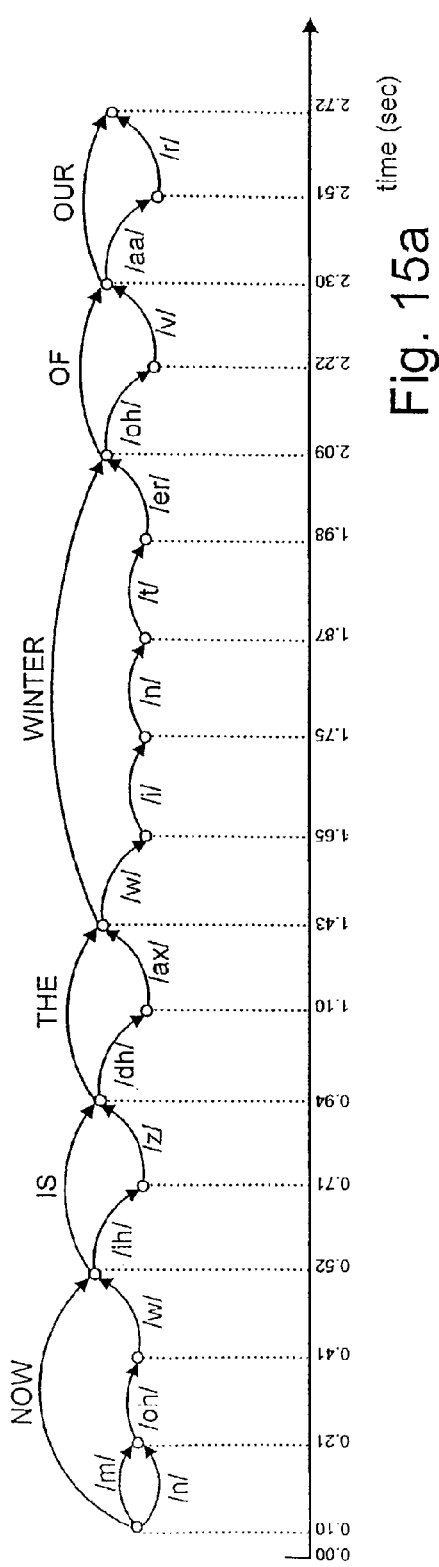
FIG. 15a is a schematic diagram of a word and phoneme lattice showing relative timings of the nodes of the lattice.

FIG. 15a shows the timing of each node of the lattice relative to a common zero time, which in the present example is set such that the first node occurs at a time of 0.10 seconds. It is noted that FIG. 15a is merely schematic and as such the time axis is not represented linearly.

Figure 15B:
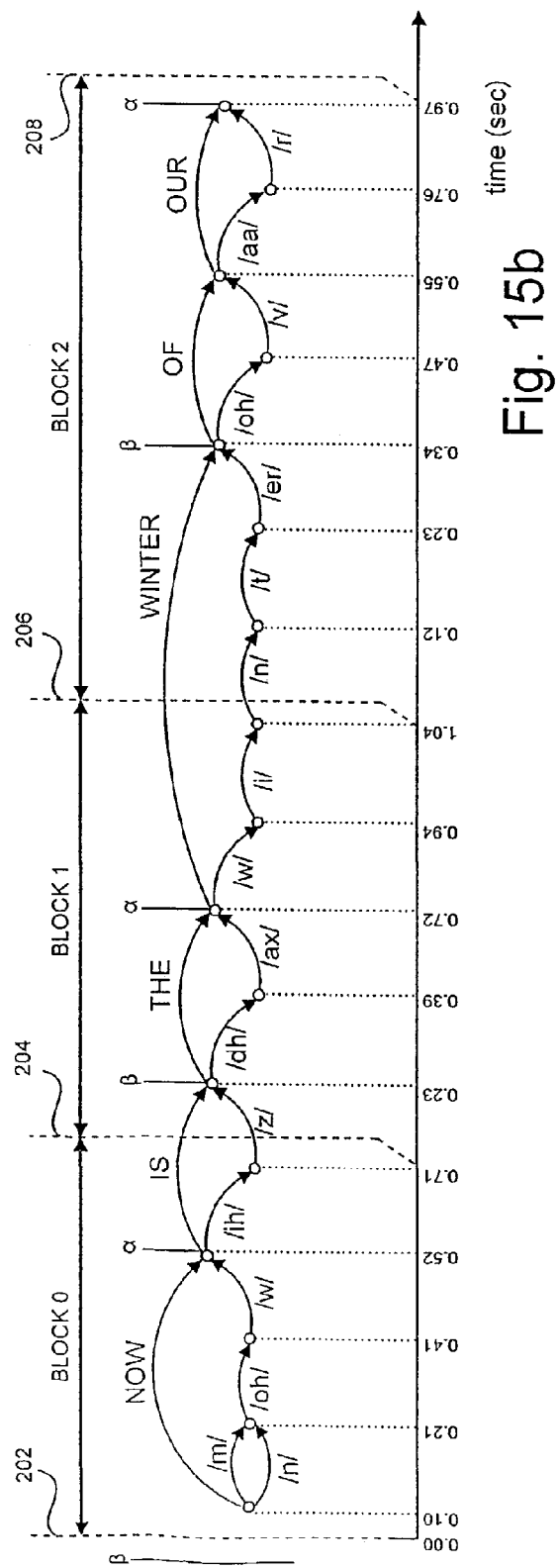
FIG. 15b is a schematic diagram showing the nodes of a word and phoneme lattice divided into blocks.

In the present embodiment, the nodes are divided into three blocks as shown in FIG. 15b. In the present embodiment, demarcation of the nodes into blocks is implemented by block markers or flags 202, 204, 206 and 208. Block markers 204, 206 and 208 are located immediately after the last node of a block, but are shown slightly spaced therefrom in FIG. 15b for the sake of clarity of the illustration. Block marker 204 marks the end of block 0 and the start of block 1, similarly block marker 206 marks the end of block 1 and the start of block 2. Block marker 208 is at the end of the lattice and hence only indicates the end of block 2. Block marker 202 is implemented at time t=0.00 seconds in order to provide the demarcation of the start of block 0. In the present embodiment, block 0 has five nodes, block 1 also has five nodes and block 2 has seven nodes.

The time of each node is provided relative to the time of the start of its respective block. This does not affect the timings of the nodes in block 0. However, for the further blocks the new off-set timings are different from each node's absolute relative timing as per FIG. 15a. In the present embodiment the start time for each of the blocks other than block 0 is taken to be the time of the last node of the preceding block. For example, in FIG. 15a it can be seen that the node between the phonemes /ih/ and /z/ occurs at 0.71 seconds, and is the last node of block 1. From FIG. 15a it can be seen that the next node, i.e. that between the phoneme /z/ and the phoneme /dh/ occurs at a time of 0.94 seconds, which is 0.23 seconds after the time of 0.71 seconds. Consequently, as can be seen in FIG. 15b, the off-set time of the first node of block 1 is 0.23 seconds.

The use of time off-sets determined relative to the start of each block rather than from the start of the whole lattice provides advantages with respect to dynamic range as follows. As the total time of a lattice increases, the dynamic range of the data type used to record the timing values in the lattice structure will need to increase accordingly, which will consume large amounts of memory. This will become exacerbated when the lattice structure is being provided for a data file of unknown length, for example if a common lattice structure is desired to be usable for annotating either a one minute television commercial or a film or television programme lasting a number of hours. In contrast, the dynamic range of the corresponding data type for the lattice structure divided into blocks is significantly reduced by only needing to accommodate a maximum expected time off-set of a single block, and moreover this remains the same irrespective of the total duration of the data file. In the present embodiment the data type employed provides integer values where each value of the integer represents the off-set time measured in hundredths of a second.

FIG. 15b also shows certain parts of the lattice structure identified as alpha (α) and beta (β). The significance of these items will be explained later.

The format in which the data is held for each respective node in the preferred form of the phoneme and word lattice data structure will now be explained with reference to FIG. 16a, which shows by way of example the format of the data for the first node of the lattice. The data for this particular node is in the form of seven data components 210, 212, 214, 216, 218, 220 and 222.

The first data component 210 specifies the time off-set of the node from the start of the block. In the present example, the value is 0.10 seconds, and is implemented by means of the integer data type described earlier above.

The second data component 212 represents the word link "NOW", which is shown in FIGS. 15a and 15b extending from the first node. The third data component specifies the nodal off-set of the preceding link, i.e. the word link "NOW", by which is meant the number of nodes the preceding link extends by. Referring to FIGS. 15a and 15b, it can be seen that the node to which the word link "NOW" extends is the third node along from the node from which the link extends, hence the nodal off-set is 3, as represented illustratively in FIG. 16a by the value 003. In the present embodiment the data type employed to implement the nodal off-set values is again one providing integer values.

The fourth data component 216 represents the phoneme /n/ which extends from the first node to the second node, entailing therefore a nodal off-set of one which leads directly to the value 001 for the fifth data component 218 as shown in FIG. 16a. Similarly the sixth data component 220 represents the phoneme link /m/, and the seventh data component 222 shows the nodal off-set of that link which is equal to 1 and represented as 001.

The manner in which the data components 212, 216 and 220 represent the respective word or phoneme associated with their link can be implemented in any appropriate manner. In the present embodiment the data components 212, 216 and 220 consist of an integer value which corresponds to a word index entry value (in the case of a word link) or a phoneme index entry value (in the case of a phoneme link). The index entry value serves to identify an entry in a corresponding word or phoneme index containing a list of words or phonemes as appropriate. In the present embodiment the corresponding word or phoneme index is held in the header part of the annotation data 31-3 described earlier. In other embodiments the header may itself only contain a further cross-reference identification to a separate database storing one or more word or phoneme indices.

Generally, the different links corresponding to a given node can be placed in the data format of FIG. 16a in any desired relative order. In the present embodiment, however, a preferred order is employed in which the word or phoneme link with the largest nodal off-set, i.e. the "longest" link, is placed first in the sequence. Thus, in the present case, the "longest" link is the word link "NOW" with a nodal off-set of three nodes, and it is therefore placed before the "shorter" phoneme links /n/ and /m/ which each only have a nodal off-set of 1. Advantages of this preferred arrangement will be explained later below.

The data for each node, in the form shown in FIG. 16a, is arranged in a time ordered sequence to form a data stream defining the whole lattice (except for the header). The data stream for the lattice shown in FIG. 15b is shown in FIG. 16b. As shown, the data stream additionally includes data components 225 to 241 serving as node flags to identify that the data components following them refer to the next respective node. The data stream also includes further data components 244, 246, 248 and 250 implementing respectively the block markers 202, 204, 206 and 208 described earlier above with respect to FIG. 15b.

Earlier, with reference to FIG. 4b, a first advantage of the block arrangement of the present lattice data structure was described, namely that it allows the search to jump into the middle of the annotation data for a given audio data stream. For this reason the header, also described with reference to FIG. 4b, includes a time index which associates the location of the blocks of annotation data within the memory to a given time offset between the time of start and the time corresponding to the beginning of the block. As is described above with respect to FIG. 15b, the time corresponding to the beginning of a given block is, in the present embodiment, the time of the last node of the block which precedes the given block.

The block arrangement shown in FIG. 15b displays however further characteristics and advantages, which will now be described. The blocks are determined according to an extent to which word or phoneme links are permitted to extend between blocks. For example, in the present embodiment, the block positions implement a criteria that no link may extend into any other block other than its directly neighbouring block. Considering the nodes of block 0, for example, it can be seen from FIG. 15b that the phoneme links /n/, /m/, /oh/, /w/ and /ih/ and word link "NOW" only extend within the same block in which their source nodes are located, which is allowed by the criteria, and the phoneme link /z/ and the word link "IS" each extend from block 0 into block 1, i.e. into the directly neighbouring block, which is also allowed by the criteria. However, there are no links extending into block 2, because such links would have to extend beyond the directly neighbouring block of block 0 (i.e. block 1) and hence are not allowed by the criteria.

By virtue of the blocks being implemented so as to obey the above described criteria, the following advantages are achieved. If further data is later to be inserted into the phoneme and word lattice structure, this may involve the insertion of one or more additional nodes. In this event, any existing link "passing over" a newly inserted node will require its nodal off-set to be increased by one, as the newly inserted node will need to be included in the count of the number of nodes over which the existing link extends. For example, if a new node were inserted at a time of 0.50 seconds into block 2, then it can be seen from FIG. 15b that the phoneme link /v/ extending from the node at 0.47 seconds to the node at 0.55 seconds would then acquire a nodal off-set value of 2, rather than its original value of 1, and similarly the word link "OF" extending from the node at 0.34 seconds to the node at 0.55 seconds would have its original nodal off-set value of 2 increased to a nodal off-set of 3. Expressed in terms of the data stream shown in FIG. 16*b*, the data component 252 originally showing a value of 001 would need to be changed to a value of 002, and the data component 254 whose original value is 002 would need to have its value changed to 003.

During insertion of such additional nodes and processing of the consequential changes to the nodal off-sets, it is necessary to search back through the lattice data structure from the point of the newly inserted node in order to analyse the earlier existing nodes to determine which of them have links having a nodal off-set sufficiently large to extend beyond the newly inserted node. An advantage of the blocks of the lattice data structure being arranged according to the present criteria is that it reduces the number of earlier existing nodes that need to be analysed. More particularly, it is only necessary to analyse those nodes in the same block in which the node is inserted which precede the inserted node plus the nodes in the neighbouring block directly preceding the block in which the new node has been inserted. For example, if a new node is to be inserted at 0.50 seconds in block 2, it is only necessary to analyse the four existing nodes in block 2 that precede the newly inserted node plus the five nodes of block 1. It is not necessary to search any of the nodes in block 0 in view of the block criteria discussed above.

This advantage becomes increasingly beneficial as the length of the lattice increases and the number of blocks formed increases. Furthermore, the advantage not only applies to the insertion of new nodes into an otherwise complete lattice, it also applies to the ongoing procedure of constructing the lattice, which may occur when nodes are not necessarily inserted into a lattice in strict time order.

Yet further, it is noted that the particular choice of the criteria to only allow links to extend into a neighbouring block may be varied, for example the criteria may allow links extending only as far as four blocks away, it then being necessary to search back only a maximum of four blocks. This still provides a significant advantage in terms of reducing the level of processing required in the case of large lattices, particularly lattices with hundreds or thousands of blocks. The skilled practitioners will appreciate that any appropriate number of blocks can be chosen as the limit in the criteria, it merely being necessary to commensurately adapt the number of blocks that are searched back through.

The lattice data structure of the present embodiment contains a further preferred refinement which is also related to the extension of the word or phoneme links into neighbouring blocks. In particular the lattice data structure further includes data specifying two characteristic points of each block. The two characteristic points for each block are shown as alpha ($\alpha$) and beta ($\beta$) in FIG. 15*b*.

Beta for a given block is defined as the time of the latest node in the given block to which any link originating from the previous block extends. Thus, in the case of block 1, beta is at the first node in the block (i.e. the node to which the phoneme link /z/ and the word link "IS" extend), since there are no links originating in block 0 that extend further than the first node of block 1. In the case of block 2, beta is at the third node, since the word link "WINTER" extends to that node from block 1. In the case of the first block of the lattice structure i.e. block zero, there are intrinsically no links extending into that block. Therefore, beta for this block is defined as occurring before the start of the lattice.

Alpha for a given block is defined as the time of the earliest node in the given block from which a link extends into the next block. In the case of block 0, two links extend into block 1, namely word link "IS" and the phoneme link /z/. Of these, the node from which the word link "IS" extends is earlier in block 0 than the node from which the phoneme link /z/ extends, hence alpha is at the node from which the word link "IS" extends. Similarly, alpha for block 1 is located at the node where the word link "WINTER" 1 originates from. In the case of the last block of the lattice, in this case block 2, there are intrinsically no links extending into any further block, hence alpha is specially defined as being at the last node in the block. Thus it can be appreciated that conceptually beta represents the latest point in a block before which there are nodes which interact with the previous block, and alpha represents the earliest point in a block after which there are nodes which interact with the next block.

As those skilled in the art will appreciate, each alpha and beta can be specified by identification of a particular node or by specification in terms of time. In the present embodiment identification is specified by nodes. The data specifying alpha and beta within the lattice data structure can be stored in a number of different ways. For example, data components of the type shown in FIG. 16*b* can be included containing flags or markers at the relevant locations within the data stream. However, in the present embodiment the points are specified by storing the identities of the respective nodes in a look-up table in the header part of the lattice data structure.

The specification of alpha and beta for each block firstly provides certain advantages with respect to analysing the nodal off-sets of previous nodes in a lattice when a new node is inserted. In particular, when a new node is inserted at a location after beta in a given block, it follows that it is only necessary to analyse the preceding nodes in the given block, and it is no longer necessary to analyse the nodes in the block preceding the given block. This is because it is already known that by virtue of the new inserted node being after beta within the given block, there can by definition be no links that extend from the previous block beyond the newly inserted node, since the position of beta defines the greatest extent which any links extend from the previous block. Thus the need to search and analyse any of the nodes of the preceding block has been avoided, which becomes particularly advantageous as the average size of blocks increases. If alternatively a new node is inserted into a given block at a location before beta of the given block, then it is now necessary to consider links originating from the preceding block as well, but only those nodes at or after alpha in the preceding block. This is due to the fact that from the definition of alpha, it is already known that none of the nodes in the preceding block that come before the preceding block's alpha have links which extend into the given block. Thus processing is again reduced, and the reduction will again become more marked as the size of individual blocks is increased. Moreover, the position of alpha in any given block will tend to be towards the end of that block, so that in the case of long blocks the majority of the processing resource that would otherwise have been used analysing the whole of the preceding block is saved.

The specification of alpha and beta for each block secondly provides certain advantages with respect to employing alpha and beta in procedures to re-define blocks within an existing lattice so as to provide smaller or more evenly arranged blocks whilst maintaining compliance with the earlier mentioned criteria that no link may extend further than one block. In these procedures, existing blocks are essentially split, according to the relative position of alpha and beta within an existing block. In one approach, provided alpha occurs after beta within a given block, the given block can be divided into two blocks by splitting it somewhere between beta and alpha. Similarly, the data specifying beta and alpha is advantageously employed to determine when existing blocks can be split into smaller blocks in the course of a preferred procedure for constructing the lattice data structure.

It was mentioned earlier above that in the present embodiment the longest link from a given node is positioned first in the sequence of data components for any given node as shown in FIG. 16a. This is advantageous during the procedure of inserting a new node into the lattice data structure, wherein previous nodes must be analysed to determine whether any links originate from them that extend beyond the newly inserted node. By always placing the longest link that extends from any given node at a particular place in the sequence of data components for that node, in the present case at the earliest place within the sequence, if that link is found not to extend over the newly inserted node then it is not necessary to analyse any of the remaining links in the sequence of data components for that node, since they will by definition be of shorter span than the already analysed longest link. Hence further processing economy is achieved.

A preferred method of generating the above described lattice data structure will now be described with reference to FIGS. 17 to 19. In this preferred method the constituent data is organised into sets of data components, and the sets of data components are added one at a time to the lattice structure as it is built up. Each set of data components consists of either:
(i) two new nodes plus any links directly therebetween (in the case of adding nodes to the lattice which are not to be connected to nodes already in the lattice); or
(ii) a new node plus each of the links that end at that node; or
(iii) a link between existing nodes within the lattice.

Figure 17:
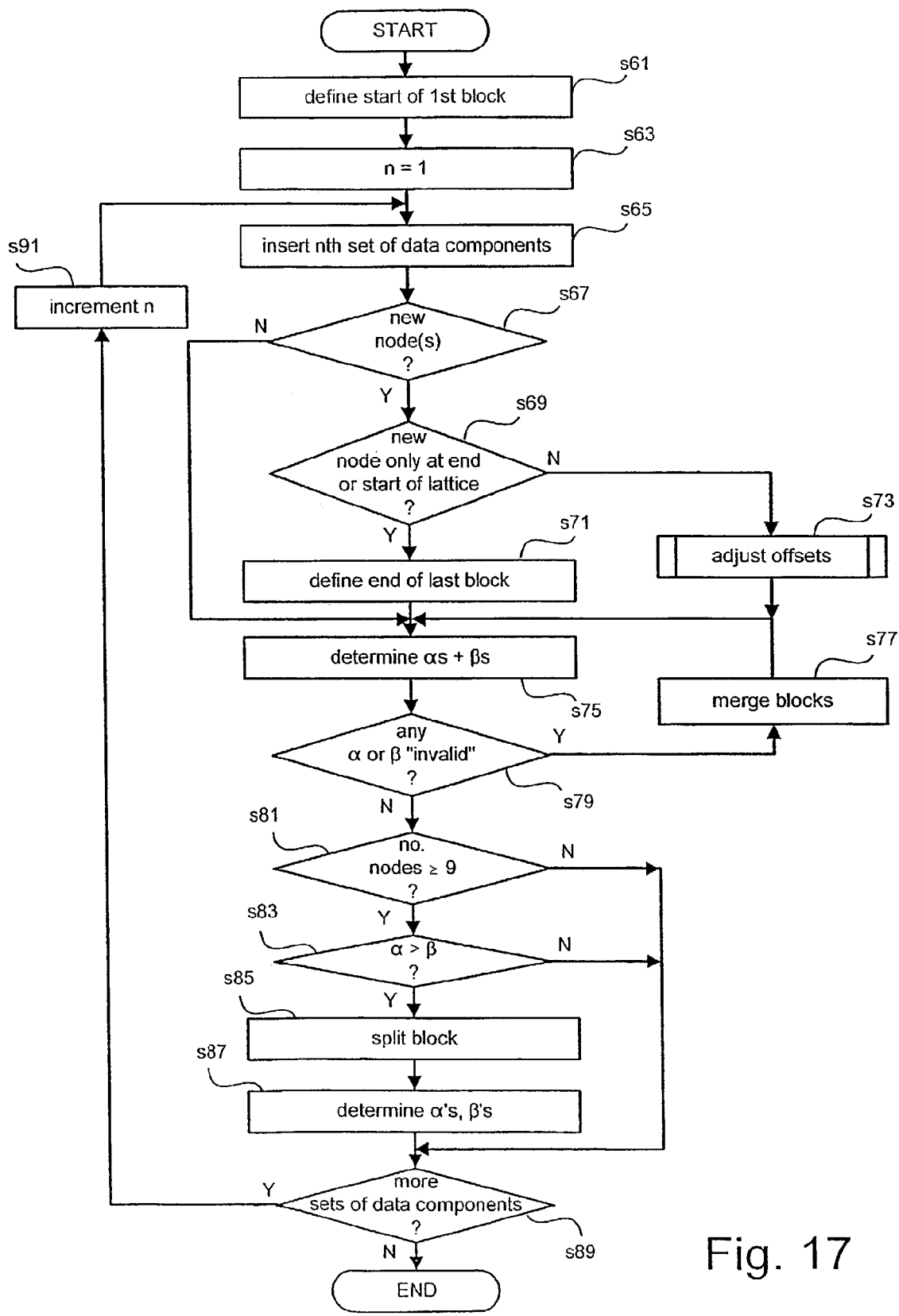
FIG. 17 is a flow diagram illustrating a process of forming a word and phoneme lattice according to one embodiment of the present invention.

FIG. 17 is a flow diagram which illustrates the process steps employed in the preferred method. In the following explanation of the process steps of FIG. 17, the application of the steps to the construction of the lattice of FIG. 15b will be demonstrated, and will thus serve to show how the method operates when applied to input data in which the nodes are already fully time sequentially ordered. Thereafter, the way in which the process steps are applied (be it to the construction of a new lattice or to the alteration of an existing lattice) when additional nodes are to be inserted into an existing time ordered sequence of nodes will be described by describing various different additions of data to the lattice data structure of FIG. 15b.

In overview, as each set of data components is added to the lattice, the various ends of blocks, alphas and betas are updated. When the number of nodes in a block reaches a critical value, in this example 9, the locations of alpha and beta are analysed and if suitable the block is split into two smaller blocks. The various alphas and betas are again updated, and the process then continues in the same manner with the addition of further data components.

The process steps laid out in FIG. 17 will now be explained in detail. Reference will also be made to FIGS. 18a to 18h which show the build up of the lattice structure in the graphical representation form of FIG. 15b. Additional reference will be made to FIGS. 19a to 19h which show the progress of the construction of the data stream defining the lattice, corresponding to the form of FIG. 16b.

Referring to FIG. 17, at step S61 the automatic speech recognition unit 33 defines the start of the first block, i.e. block zero. In FIG. 18a the block marker defining the starter of the first block is indicated by reference number 202. This is implemented in the data stream by insertion of data component 244 (see FIG. 19a) consisting of a block flag.

At step S63 the automatic speech recognition unit 33 sets an incremental counter n equal to 1.

At step S65 the automatic speech recognition unit 33 inserts the first set of data components into the data stream defining the lattice data structure. More particularly, the automatic speech recognition unit 33 collects the data corresponding to the first two nodes of the lattice and any direct phoneme links therebetween (in this case phoneme links /n/ and /m/). It then additionally collects any words that have been identified by the word decoder 37 as being associated with a link between these two nodes, although in the case of the first two nodes no such word has been identified. It then inserts the corresponding data components into the data stream. In particular, referring again to FIG. 19a, data 260 defining the first node of the lattice structure, and being made up of a data component consisting of a node flag and a data component indicating the time of the node, is inserted. Thereafter data 262 comprising the data component consisting of the phoneme link /n/ and the nodal off-set value of 001 is inserted, followed by data 264 comprising a data component consisting of the phoneme /m/ and nodal off-set value 001. Finally, data 266 comprising the data component consisting of a node flag and the data component consisting of the time of that second node is inserted. Thus all of the component parts 260, 262, 264, 266 of the first set of data components are inserted. The first two nodes and the phoneme links /n/ and /m/ therebetween can be seen in FIG. 18a also. At step S67 the automatic speech recognition unit 33 determines whether any new nodes have been included in the newly inserted set of data components. The answer in the present case is yes, so the process moves on to step S69 where the automatic speech recognition unit determines whether any of the new nodes are now positioned at the end of the current data lattice structure. The answer in the present case is again yes. In fact, when the method shown in the flow chart of FIG. 17 is used to construct a data lattice from data in which the nodes are ordered in a time sequential manner, as in the present case, the answers to the determination steps S67 and S69 will inherently always be positive. These determination steps are only included in the flow chart to illustrate that the process is capable of accommodating additional nodes or links to be inserted within the lattice when required (examples of these cases will be given later below).

In the present case, the process then moves on to step S71, where the automatic speech recognition unit 33 defines the end of the last block to be immediately after the newly inserted node which is at the end of the lattice. At this stage of the procedure there is only one block, hence in defining the end of the last block, the end of the sole block is in fact defined. This newly defined current end of the block is shown as item 203 in FIG. 18a, and is implemented in the data stream as data component 245 consisting of a block flag, as shown in FIG. 19a.

The automatic speech recognition unit 33 then determines all of the alpha and beta points. At the present stage there is only one block so only one alpha and one beta is determined. The procedure for determining alpha and beta in the first block was described earlier above. The resulting positions are shown in FIG. 18a. With respect to the data stream, the alpha and beta positions are entered into the header data, as was described earlier above.

As step S79 the automatic speech recognition unit 33 determines whether any of the alpha and beta values are "invalid", in the sense of being either indeterminate or positioned such as to contravene the earlier described criteria that no link may extend further than into a directly neighbouring block. At the present stage of building up the lattice this determination step obviously determines that there is no such invalidity, and hence the process moves to step S81. At step S81 the automatic speech recognition unit determines whether the number of nodes in any blocks that have just had nodes inserted in them has reached or exceeded a predetermined critical number. The predetermined critical number is set for the purpose of defining a minimum number of nodes that must be in a block before the block structure will be analysed or altered for the purposes of giving smaller block sizes or more even block spacings. There is an effective overhead cost in terms of resources that are required when carrying out block division, data storage of the block flag data, and so on. Hence block division for blocks containing less than the critical number of nodes would tend to be counter productive. The choice of the value of the critical number will depend on the particular characteristics of the lattice or data file being considered. As mentioned above, in the present embodiment the number is set at nine. Hence at the present stage of the process, where only two nodes have been inserted in total, the answer to the determination step S81 is no.

The process steps are thus completed for the first set of data components to be inserted, and the current form of the lattice and data stream is shown in FIGS. 18a and 19a.

The procedure then moves to step S89, where the automatic speech recognition unit determines that more sets of data components are to be added, and hence at step S91 increments the value of n by one and the process steps beginning at steps S65 are repeated for the next set of data components. In the present case the next set of data components consists of data (item 270 in FIG. 19b) specifying the third node of the lattice and its time of 0.41 seconds and data (item 268 in FIG. 19b) specifying the phoneme link /oh/ plus its nodal off-set value of 001. The phoneme link /oh/ and third node are shown having been inserted in FIG. 18b also. At step S71, the end 203 of the block, being defined as after the last node, is therefore now positioned as shown in FIG. 18b, and is implemented in the data stream by the data component 245, consisting of a block flag, now being positioned after the newly inserted data 268 and 270. The new position of alpha, now at the new end node, as determined at step S75, is shown in FIG. 18b. At step S79 it is again determined that there is no invalid alpha or beta, and because the number of nodes is only three (i.e. less than nine) processing of this latest set of data components is now complete, so that the lattice and data stream are currently as shown in FIGS. 18b and 19b.

As the procedure continues, the fourth node and the two links which end at that node, namely the phoneme link /w/ and the word link "NOW", representing the next set of data components, are inserted. The process steps from S65 onwards are followed as described for the previous sets of data components, resulting in the lattice structure shown in FIG. 18c and the data stream shown in FIG. 19c. It can be seen in FIG. 19c that the data 272 corresponding to the phoneme link /w/ and the data 274 corresponding to the latest node is just before the last block flag at the end of the data stream, whereas the data 276 corresponding to the word link "NOW" is placed in the data stream with the node from which that link extends, i.e. the first node. Moreover it is placed before the other links that extend from the first node, namely the phoneme links /n/ and /m/ because their nodal off-set values are 001 which are less than the value of 003 for the word link "NOW".

The procedure continues as described above without variation for the insertion of the fifth, sixth, seventh and eighth nodes providing the lattice structure and data stream shown in FIGS. 18d and 19d respectively. On the next cycle of the procedure starting at step S65, the set of data components inserted is the ninth node and the phoneme link /w/ ending at that node. Following implementation in the same manner as above of the steps S67, S69, S71 and S75, the lattice arrangement is as shown in FIG. 18e-1, with the end 203 of the block located after the newly inserted ninth node, and alpha located at that ninth node. At step S79 the automatic speech recognition unit determines that there is no invalidity of the alpha and beta values and so the process moves on to step S81. The procedure to this point has followed the same as for the previous sets of data components. However, since this time the newly inserted node brings the total number of nodes in the sole block up to nine, when the automatic speech recognition unit carries out the determination step S81 it determines for the first time that the number of nodes in the block is indeed greater than or equal to nine. Consequently, this time the procedure moves to step S83, where the automatic speech recognition unit determines whether alpha is greater than beta, i.e. whether alpha occurs later in the block than beta. This is determined in the present example to be the case (in fact this will always be the case for the first block of a lattice due to the way beta is defined for the first lattice).

It can thus be appreciated that the basic approach of the present method is that when the number of nodes in a block reaches nine or more, the block will be divided into two blocks, provided that alpha is greater than beta. The reason for waiting until a certain number of nodes has been reached is due to the cost in overhead resource, as was explained earlier above. The reason for the criteria that alpha be greater than beta is to ensure that each of the two blocks formed by the division of an original block will obey the earlier described criteria that no link is permitted to extend into any block beyond a directly neighbouring block.

Therefore, in the present case, the procedure moves to step S85 in which the automatic speech recognition unit splits the sole block of FIG. 18e-1 into two blocks. This is carried out by defining a new end of block 205 which is positioned according to any desired criteria specifying a position somewhere between beta and alpha. In the present embodiment the criteria is to insert the new end of block equally spaced (in terms of the number of nodes, rounded up where necessary) between beta and alpha. Thus, the block is split by insertion of a new end of block 205 immediately after the fifth node, as shown in FIG. 18e-2. This is implemented in the data stream by the insertion of data component 298, consisting of a block flag, as shown in FIG. 19e. Additionally, the automatic speech recognition unit 33 recalculates the times of all of the nodes in the newly formed second block as off-sets from the start time of that block, which is the time of the fifth node of the whole lattice (0.71 seconds). Hence the resulting data stream, shown in FIG. 19e, now contains the newly inserted data component 298, newly inserted data 300 relating to the phoneme link /w/ and newly inserted data 302 relating to the end node. Morever, the data components 304, 306, 308 and 310 have had their time values changed to new off-set values.

At step S87 updated values of alpha and beta are determined by the automatic speech recognition unit. Given there are now two blocks, there are two betas and two alphas to be determined. The new locations of these alphas and betas are shown in FIG. 18*e*-2.

The procedure of FIG. 17 thereafter continues as described above for the insertion of the tenth through to thirteenth node of the overall lattice without the critical number of 9 nodes yet being reached in block 1. This provides the lattice structure and data stream shown in FIGS. 18*f* and 19*f* respectively.

The next set of data components inserted consists of the fourteenth node and the phoneme link /oh/ ending at that node. The situation after steps S65 to S79 are implemented for this set of data components is shown in FIG. 18*g*-1. Insertion of this latest set of data components has brought the number of nodes in the second block up to nine, and alpha is after beta. Consequently, the automatic speech recognition unit 33 carries out step S85 in which it inserts a new end of block 207 immediately after the fifth node of the block to be split, as shown in FIG. 18*g*-2. This is implemented in the data stream by insertion of data component 330 consisting of a new block flag, as shown in FIG. 19*g*. The automatic speech recognition unit 33 also calculates the adjusted off-set times (334,336,338,340 in FIG. 19*g*) of the nodes in the newly formed third block. Thereafter, at step S87, the automatic speech recognition unit determines updated values of the alphas and betas, which provides a new alpha for what is now the second block and a new beta for what is now the third block, both of which are also shown in FIG. 18*g*-2.

The procedure shown in FIG. 17 is repeated for the remaining three sets of data components yet to be added, so providing the lattice structure and data stream shown in FIGS. 18*h* and 19*h*.

At this stage, the automatic speech recognition unit 33 determines at step S89 that no more sets of data components are available to be inserted, and hence the current lattice data structure is complete, and indeed corresponds to the lattice shown in FIGS. 15*b* and 16*b*.

An example will now be given to demonstrate the merging of two blocks due to the later insertion of a long link that extends beyond a neighbouring block. This situation did not arise in the earlier example because the data was added into the lattice on a fully time ordered sequential basis. In contrast, in the following example, after the lattice of FIG. 15*b* has reached the stage described so far, an additional link is required to be inserted between certain existing nodes. There are a number of reasons why this might occur. One possibility is that the lattice has been completed earlier, then employed as annotation data, but at a later date needs revision. Another possibility is that all the phoneme data is processed first, followed by all the word data, or vice-versa. Yet another possibility is that the data from different soundtracks, e.g. different speakers, is separately added to provide a single lattice.

Figure 20A:
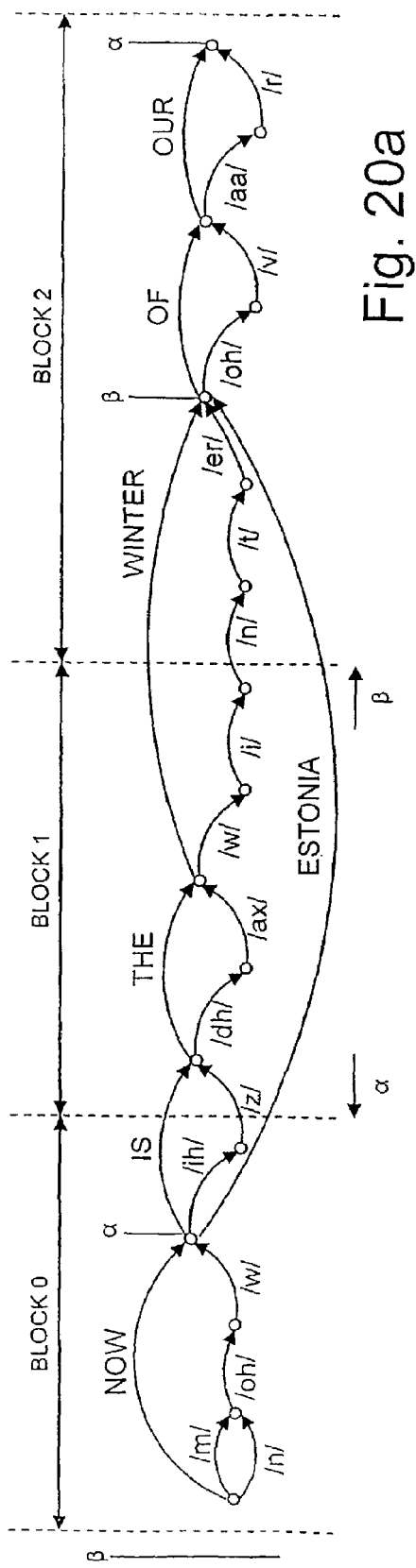
FIGS. 20a to 20c are schematic diagrams showing the updating of a word and phoneme lattice on insertion of a long link.

However, in the present example, the insertion of the earlier timed link is essentially part of the original on-going construction of the lattice, although the data component consisting of the additional link is processed separately at the end because it constitutes a word recognised by the automatic speech recognition unit 33 when passing the phoneme data through a second speech recognition vocabulary. In the present example, the second vocabulary consists of a specialised name place vocabulary that has been optionally selected by a user. Hence, in the present example, at step S89 it is determined that a further set of data components is to be inserted, and following incrementing of the value of n at step S91, the data is inserted at step S65. The data consists of the word link "ESTONIA" and extends from the fourth node of block 0 to the third node of block 2, as shown in FIG. 20*a*.

At step S67 the automatic speech recognition unit 33 recognises that no new node has been inserted, hence the process moves to step S75 where it determines updated locations of alpha and beta. However, because the newly inserted link extends from block 0 right over block 1 to end in block 2, it contravenes the earlier described criteria barring link extensions beyond directly neighbouring blocks, and moreover does not produce a valid alpha or beta for block 1. This is represented in FIG. 20*a* by the indication that any alpha for block 1 would in fact need to appear in block 0, and any beta for block 1 would need to appear in block 2. Consequently, at the next step S79, it is determined that alpha and beta are indeed invalid.

The procedure therefore moves to step S77 which consists of merging blocks. Any suitable criteria can be used to choose which blocks should be merged together, for example the criteria can be based on providing the most evenly spaced blocks, or could consist of merging the offending block with its preceding block. However, in the present embodiment the choice is always to merge the offending block with its following block, i.e. in the present example block 1 will be merged with block 2.

Figure 20B:
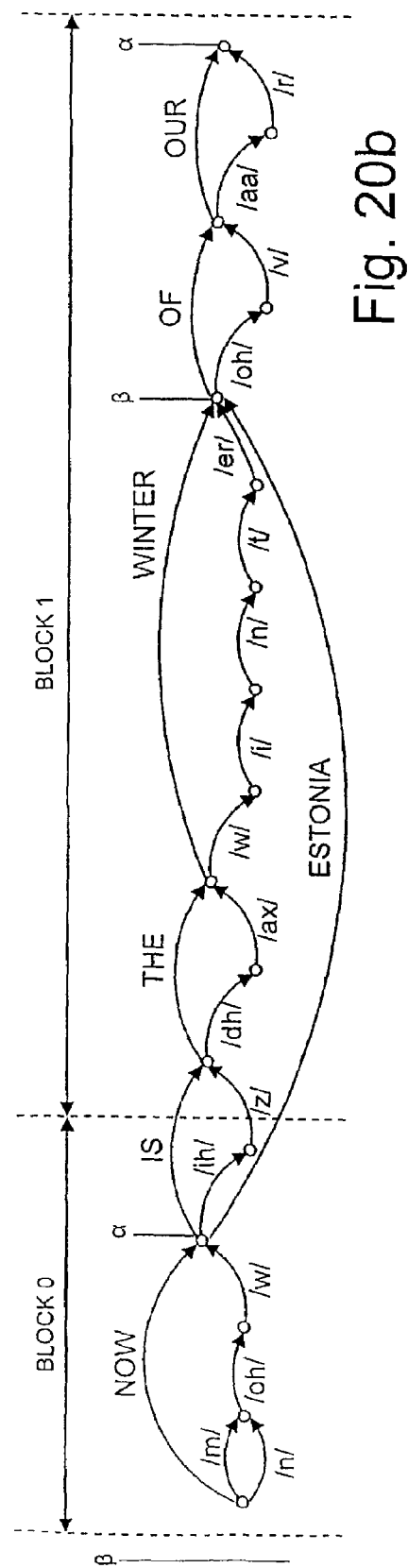

This is implemented by removal of the block marker dividing block 1 from block 2, resulting in two blocks only, as shown in FIG. 20*b*. The procedure then returns to step S75, where the alphas and betas are determined again. The resulting positions of alpha and beta are shown in FIG. 20*b*.

Figure 20C:
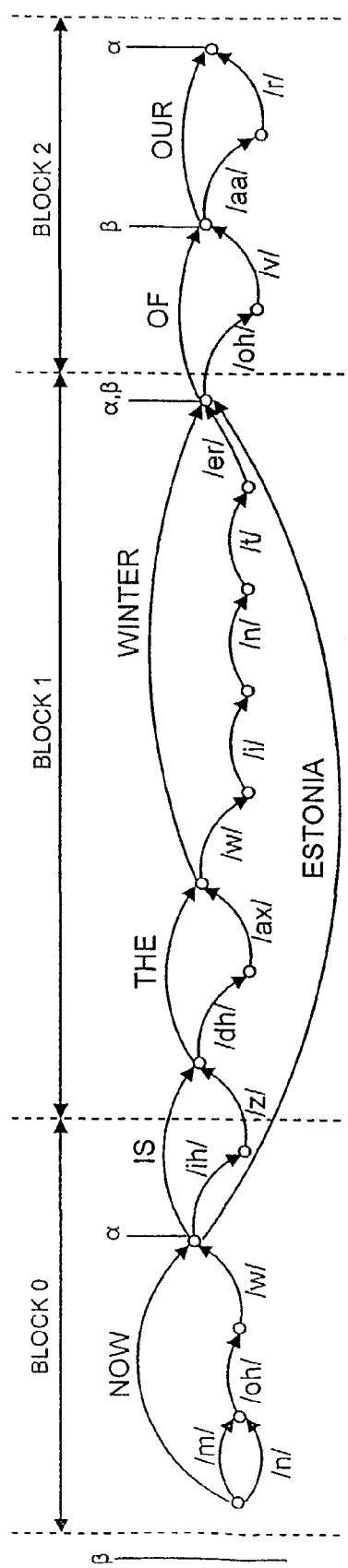

At step S79 the automatic speech recognition unit 33 determines that alpha and beta are now valid, so the procedure moves to step S81. In the present example, because there are now twelve nodes in block 1 and because alpha is greater than beta, the procedure moves to step S85 and block 1 is split using the same procedure as described earlier above. However, the earlier employed criteria specifying where to locate the new block division, namely half way in terms of nodes between beta and alpha, contains in the present example a refinement that when the block to be split has greater than nine nodes, splitting should, where possible, leave the earlier of the two resulting blocks with no more than eight nodes. This is to avoid inefficient repetitions of the block splitting process. Hence in the present example the new block marker is inserted immediately after the eighth node of the block being split, as shown in FIG. 20*c*. At step S87 the alphas and betas are again determined, the new positions being shown in FIG. 20*c*. It is noted that alpha and beta both occur at the same node of block 1. In the present example it is determined at step S89 that no more sets of data components are to be added, and hence the procedure is completed.

In the above procedure described with reference to FIGS. 20*a* to 20*c*, the changes to the lattice are implemented by changes to the data stream of FIG. 16*b* in corresponding fashion to the earlier examples. In particular, step S77 of merging the two blocks is implemented by removal of the relevant data component 248 containing the original block flag dividing the original block 1 and 2.

A further example demonstrating the processing of data according to the procedure laid out in the flow chart of FIG. 17 will now be described with reference to FIGS. 21*a* to 21*d*. In this example, additional data components are added immediately after the seventeenth node has been added to the lattice of FIG. 15*c*. Therefore at step S89 of FIG. 17 further components are indeed to be added and the procedure returns again via increment step S91 to insertion step S65. However, the method steps employed to add the additional data components in the following example also constitute a stand alone method of updating or revising any suitable original lattice irrespective of how the original lattice itself was formed.

In this further example, additional data is added via a keyboard and a phonetic transcription unit, of the same form as the keyboard 3 and phonetic transcription unit 75 shown in FIG. 9. In this further example the output of the phonetic transcription unit is connected to the automatic speech recognition unit 33. The user uses this arrangement to enter annotation data which he intends to correspond to a specific portion of the video data 31-1. Such data is sometimes referred to in the art as "metadata". The specific portion of the video data may show, for example, a number of profile shots of an actor, which the user wishes to be able to locate/retrieve at a later date as desired by using the annotation data. Hence, he enters the words "PROFILE A B C D E" and moreover specifies that only word links, not phoneme links, should be transcribed. This provides the following data components to be added:

(i) a first new node, a second new node, and a word link "PROFILE" therebetween;

(ii) a third new node, and the word link "A" between the new second and third nodes;

(iii) a fourth new node, and the word link "B" between the new third and fourth nodes;

(iv) a fifth new node and the word link "C" between the new fourth and fifth nodes;

(v) a sixth new node and the word link "D" between the new fifth and sixth nodes; and (vi) a seventh new node and the word link "E" between the new sixth and seventh nodes.

Figure 21A:
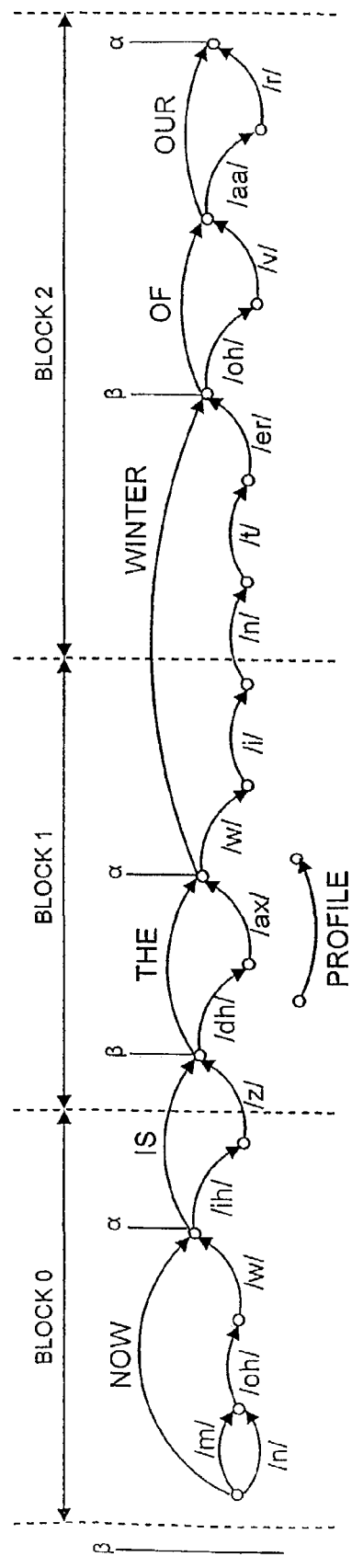
FIGS. 21a to 21d are schematic diagrams illustrating the updating of a word and phoneme lattice on insertion of additional nodes.

Referring again to FIG. 17, at step S65 data component (i) as described above is inserted by the automatic speech recognition unit 33 into the lattice of FIG. 15*b*, in the position shown in FIG. 21*a*. At step S67, the automatic speech recognition unit 33 determines that new nodes have been inserted. At step S69 the automatic speech recognition unit determines that neither of the new nodes have been inserted at either the start or the end of the lattice. In other words, the new nodes have been inserted within an existing lattice, and hence it will probably be necessary to adjust the nodal off-sets of one or more existing nodes of the lattice. The procedure therefore moves to step S73, in which the automatic speech recognition unit 33 carries out such necessary adjustment of the nodal off-sets of existing nodes. Any appropriate method of adjusting the off-sets can be employed at step S73. In the present embodiment a preferred method is employed, and this will be described in detail later below with reference to the flow chart of FIG. 22.

Figure 21B:
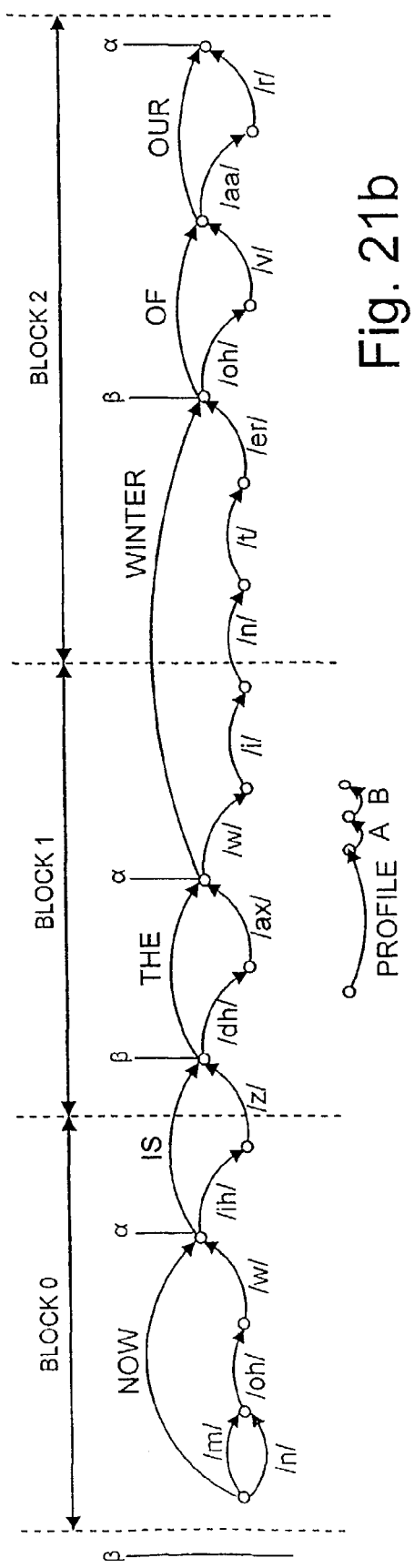
Figure 21C:
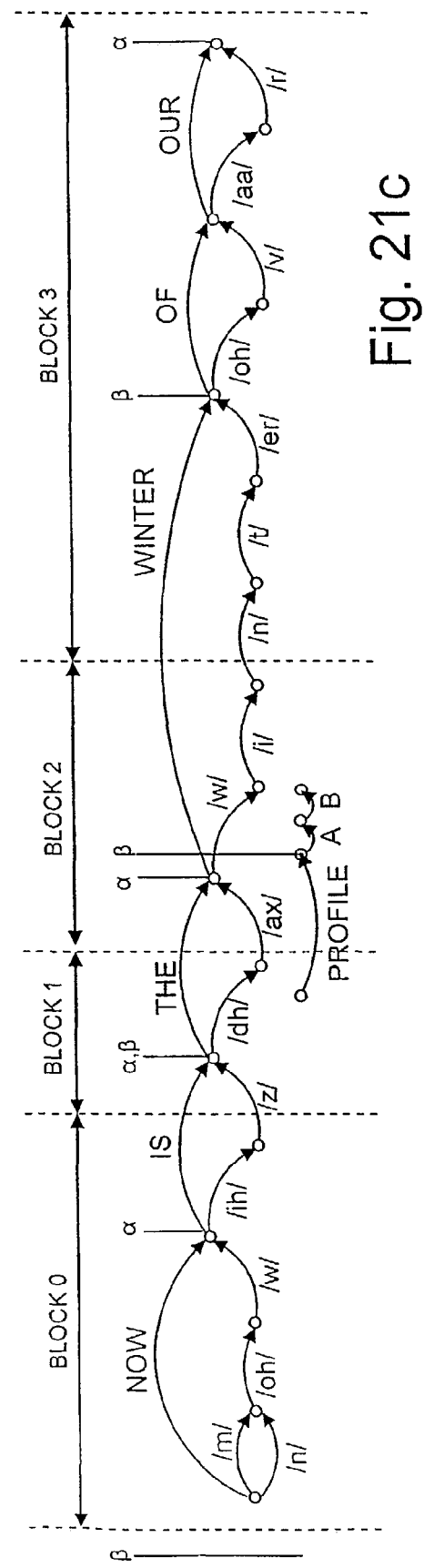

Following adjustment of the off-sets, the procedure of FIG. 17 is followed in the manner described above for the earlier examples, returning to step S65 for insertion of data component (ii). The procedure described above with respect to data component (i) is then repeated for data components (ii) and (iii). FIG. 21*b* shows the stage reached when data components (i), (ii) and (iii) have been inserted and the procedure has reached step S81. At this stage, for the first time during this insertion of additional data components, it is now determined that the number of nodes in the second block equals 9. Hence at step S83 the automatic speech recognition unit 33 splits the block and at step S87 determines the new alphas and betas, resulting in the new block structure shown in FIG. 21*c*. It is noted that the criteria employed for locating the new block end is one in which the size of the newly formed second block is made as large as possible except that placing the end of the block at alpha itself is not allowed.

Figure 21D:
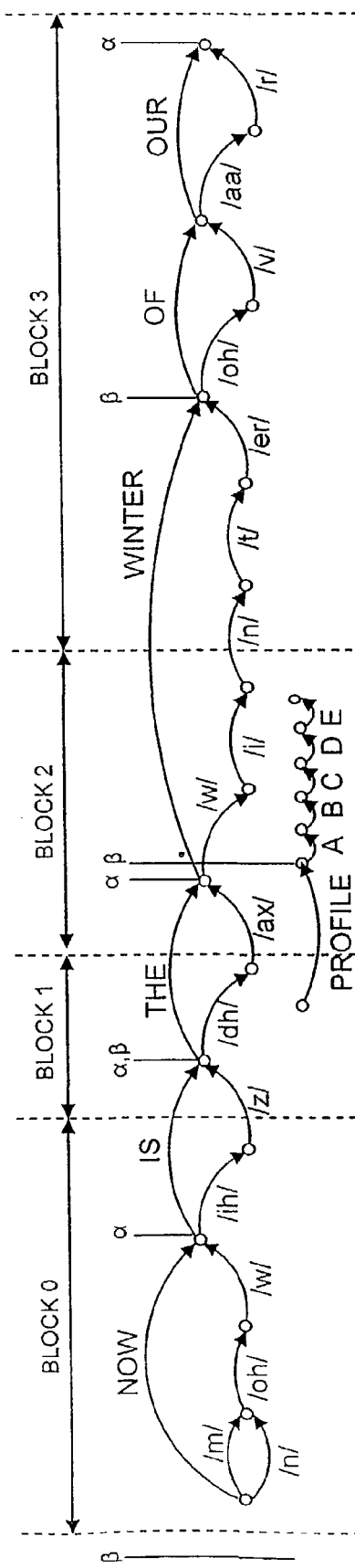

The procedure then continues in the same fashion resulting in the insertion of data components (iv), (v) and (vi) up to reaching step S81 during processing of data component (vi). At this stage, the lattice is of the form shown in FIG. 21*d*, i.e. nine nodes are now located in present block 2, and hence the outcome of step S81 is that the procedure again moves to step S83. It is noted that the present example has thrown up a situation in present block 2 where beta occurs after alpha, in other words the longest link extended into block 2 extends beyond the start of the earliest link exiting that block 2, as can be seen in FIG. 21*d*. If block 2 were to be split in such circumstances, this would inherently involve forming a new block that contravenes the basic criteria of the present embodiment that no link is allowed to extend into any other blocks other than its directly neighbouring block. Because of this, the method of FIG. 17 does not allow splitting of block 2 despite it having nine nodes, and this is implemented by the outcome of determination step S83 being that alpha is not greater than beta leading to the procedure moving directly on to step S89. In the present example it is determined at step S89 that no more sets of data components are to be added, and hence the procedure ends.

The above-mentioned preferred procedure for implementing step S73 of adjusting the off-sets will now be described with reference to the flow chart of FIG. 22, which shows the procedure followed for each newly inserted node. The preferred method uses the fact that the location of alpha and beta in each block is known. The automatic speech recognition unit 33 analyses nodes preceding the newly inserted node, to determine any links that extend from those nodes beyond the location of the newly inserted node. If any such node is found, then any affected link needs to have its nodal off-set value increased by one, to accommodate the fact that the newly inserted node is present under its span. If the newly inserted node is positioned after beta within a given block, then only those nodes before the newly inserted node and within the same given block need be analysed, since there are inherently no links extending from the previous block beyond beta. Alternatively, if a newly inserted node is positioned before beta in the given block, then the nodes before the newly inserted node in that given block need to be analysed plus the nodes in the preceding block, but only so far back as to include the node corresponding to alpha. The nodes positioned before alpha of the preceding block do not need to be analysed because inherently there are no links extending from before alpha into the block in which the new node has been inserted.

Figure 22:
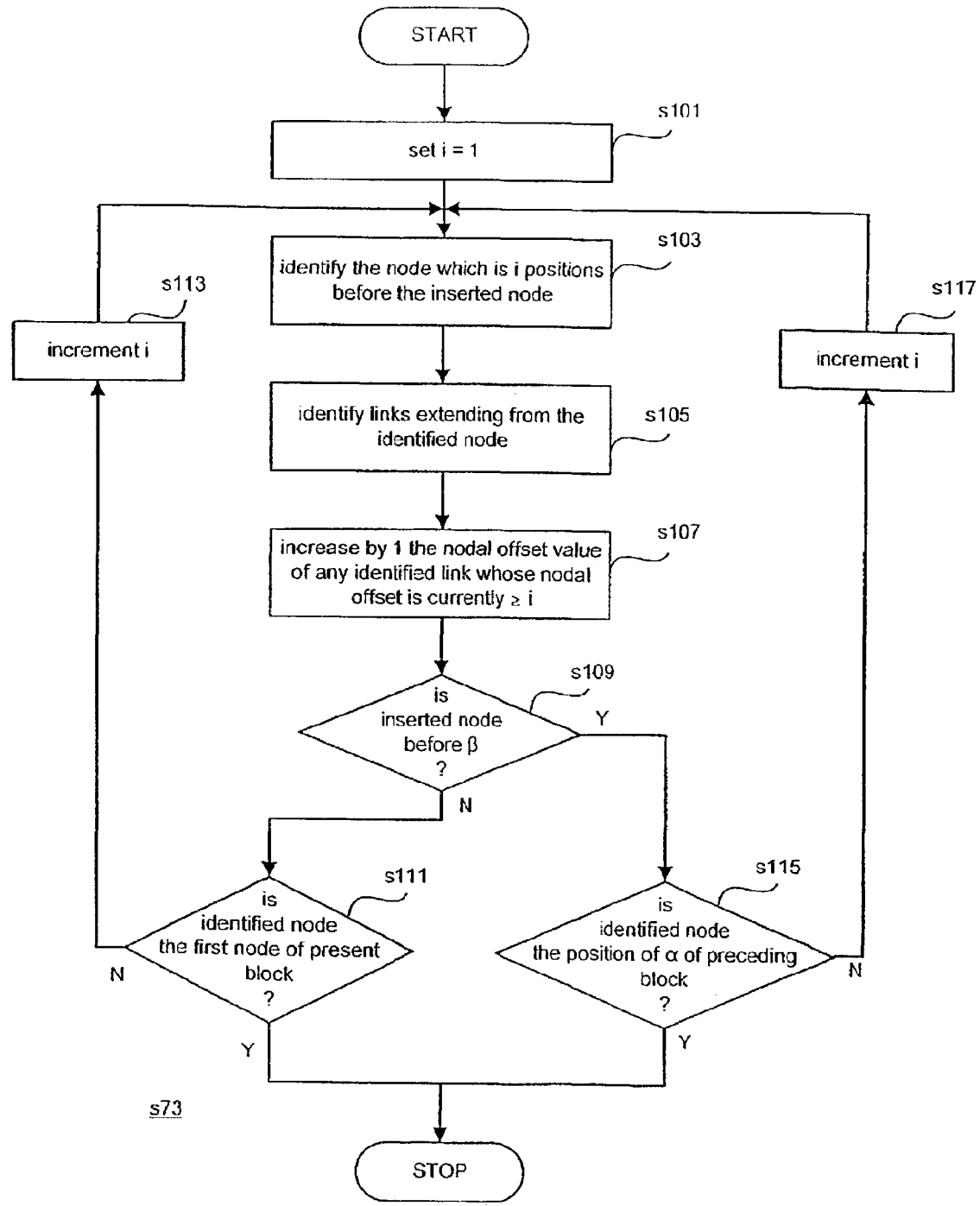
FIG. 22 is a flow diagram illustrating a procedure of adjusting off-sets.

The above procedure is implemented by the process steps shown in FIG. 22. At step S101 the automatic speech recognition unit 33 sets an increment counter to the value i=1. The increment counter is used to control repeated application, as required, of the procedure to consecutive earlier nodes on a node-by-node basis. At step S103 the node which is positioned one place before the inserted node is identified. Referring to FIG. 21*a*, in the case of the newly inserted node from which the word link "PROFILE" extends, the identified node one position before it is the node from which the word link "THE" extends. At step S105, all the links extending from the identified node are identified, being here the word link "THE" and the phoneme link /dh/. The automatic speech recognition unit 33 determines the nodal off-set value of these links, which is 002 for the word link "THE" and 001 for the phoneme link /dh/, and hence at step S107 increases each of these nodal off-set values by one, to the new values of 003 and 002 respectively. At step S109 it is determined whether the newly inserted node was positioned before beta. In the present case it was actually positioned after, hence analysis of the nodes need only continue back to the first node of the present block, and hence at step S111 it is determined whether the currently identified node, i.e. the node that has just had its nodal off-sets changed, is the first node of the present block. In the present case it is, and since no further nodes need to have their off-sets adjusted, the procedure ends. If, however, further nodes remained to be processed in the present block, then the procedure would continue to step S113 where the value of i is incremented, and then the procedure would be repeated for the next previous node starting from step S103. Also, if in the above example the newly inserted node was in fact located before beta, then the procedure would be continued on until each node up to the node corresponding to alpha in the preceding block had been processed. In order to achieve this, when the inserted node is indeed before beta then the procedure moves to step S115 where the automatic speech recognition unit determines whether the identified node is at the position of alpha of the preceding block. If it is then the procedure is complete. If it is not, then the procedure moves to step S117 where the value of i is incremented, and then the procedure is repeated from step S103.

An alternative way of splitting a block will now be described. When the number of nodes in a given block has reached the critical number and alpha is later than beta for the given block, then the given block and the preceding block are adjusted to form three new blocks in place of those two blocks. This procedure will now be described more fully with reference to FIGS. 23a and 23b.

Figure 23A:
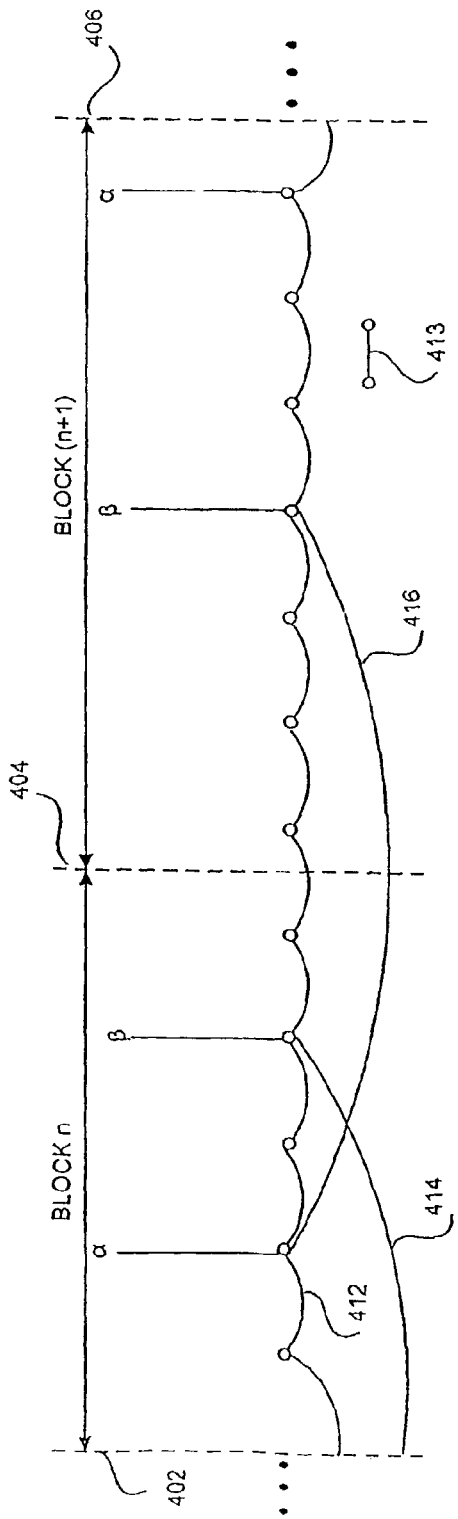
FIGS. 23a and 23b are schematic diagrams illustrating the application of a block splitting procedure to a word and phoneme lattice.

FIG. 23a shows a sequence of nodes within a lattice, linked by phoneme links for example phoneme link 412, the end part of a word link 414 and a further word link 416. The nodes are divided into blocks by block markers 402, 404 and 406, forming blocks n and (n+1) of the lattice.

Figure 23B:
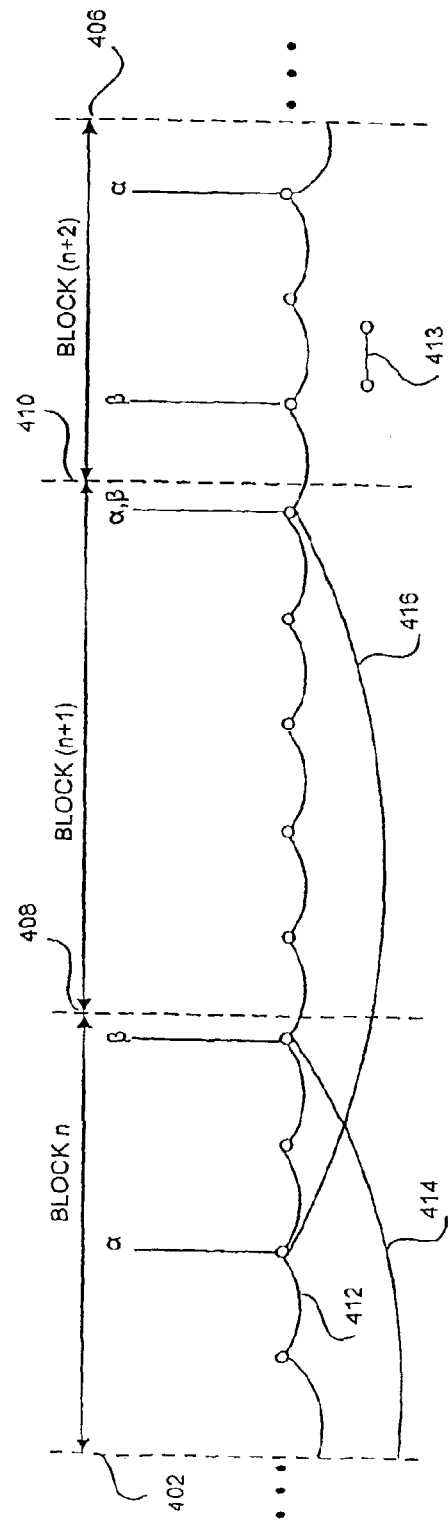

The positions of alpha and beta for block n and block (n+1) respectively are shown also. FIG. 23a shows the state of the lattice after the data represented by phoneme link 413 and the two nodes between which it extends has been inserted. The number of nodes in block (n+1) has now reached nine, and since also alpha is later than beta, block rearrangement is now implemented. The two blocks of FIG. 23a are replaced by three blocks, namely block n, block (n+1) and block (n+2), as shown in FIG. 23b. This is implemented by deleting the block divider 404, and replacing it with two new block dividers 408 and 410 placed immediately after beta of block n and beta of block (n+1) respectively. Alpha and beta for each block is thereafter re-calculated and the new positions are shown in FIG. 23b. This procedure for rearranging the blocks provides particularly evenly spaced blocks. This is particularly the case when a given block has the required number of nodes for splitting and its alpha is after beta, yet in the block preceding it beta is positioned after alpha. It is noted that this was indeed the case in FIG. 23a. Because of this, in the preferred embodiment, block splitting is carried out by this procedure of forming a new block between the two beta positions when beta is positioned after alpha in the relevant preceding block, but block splitting follows the originally described procedure of dividing the present block between alpha and beta when beta is positioned before alpha in the preceding block.

In an alternative version of the embodiments described in the preceding paragraph, the two new block dividers may be positioned at nodes relatively close, compared to the number of nodes in each block, to the position of beta of block n and beta of block (n+1) respectively, instead of at those two beta positions as such.

In the above embodiments, the timing of each node of the lattice is provided, prior to arrangement in blocks, relative to a common zero time set such that the first node occurs at a time of 0.10 seconds. The start time for the first block is set equal to the common zero time. The start time for each of the other blocks is the time of the last node of the preceding block. However, in an alternative embodiment the timing of each node may be provided in an absolute form, and the block marker demarcating the start of each block may be given a Universal Standard Time (UST) time stamp, corresponding to the absolute time of the first node of that block rounded down to the nearest whole second. The UST time stamp may be implemented as a 4 byte integer representing a count of the number of seconds since 1 Jan. 1, 1970. The times of the nodes in each block are then determined and stored as offset times relative to the rounded UST time of the start of the block. Because in this embodiment each block time is rounded to the nearest second, if block durations of less than 1 second were to be permitted, then two or more blocks could be allocated the same time stamp value. Therefore, when UST time stamps are employed, block durations less than 1 second are not permitted. This is implemented by specifying a predetermined block duration, e.g. 1 second, that a current block must exceed before splitting of the current block is performed. This requirement will operate in addition to the earlier described requirement that the current block must contain greater than a predetermined number of nodes before splitting of the current block is performed. Alternatively, shorter block durations may be accommodated, by employing a time stamp convention other than UST and then rounding down the block marker times more precisely than the minimum allowed duration of a block.

Figure 24:
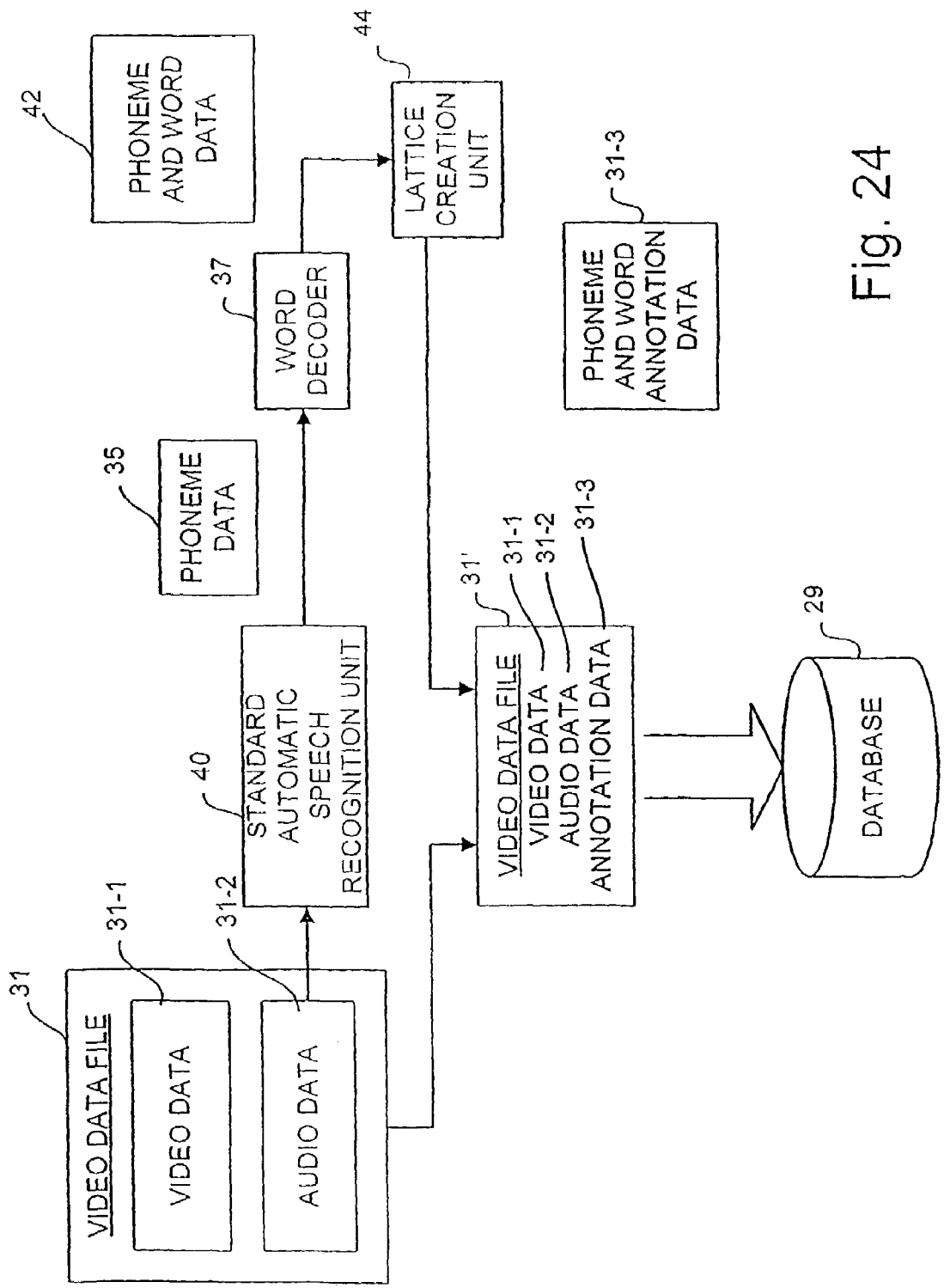
FIG. 24 is a block diagram illustrating one way in which the phoneme and word annotator can generate the annotation data from an input video data file.

In the above embodiments the phoneme and word lattice structure was determined and generated by the automatic speech recognition unit 33, configured with the requisite functionality. As will readily be appreciated by those skilled in the art, a standard automatic speech recognition unit can be used instead, in conjunction with a separate lattice creation unit comprising the functionality for determining and generating the above described phoneme and word lattice structure. An embodiment employing a standard automatic speech recognition unit 40, which outputs a sequence of phonemes is shown in FIG. 24. As was the case for the arrangement shown in earlier FIG. 3, the word decoder 37 identifies words from the phoneme data 35. In the embodiment illustrated in FIG. 24, the identified words are added to the phoneme data to form phoneme and word data 42. This is then passed to a lattice creation unit 44, which determines and generates the above described phoneme and word lattice structure which forms the phoneme and word annotation data 31-3. In other embodiments, which include a standard automatic speech recognition unit which only outputs words, a word to phoneme dictionary can be used to generate phonemes, and then the words and phonemes are combined and formed into the above described phoneme and word lattice structure by a lattice creation unit (not shown).

In the above embodiments, the phoneme and word data was associated with the links of the lattice. As those skilled in the art will appreciate, the word and/or the phoneme data can be associated with the nodes instead. In this case the data associated with each node would preferably include a start and an end time for each word or phoneme associated therewith.

A technique has been described above for organising an unordered list of nodes and links into an ordered and blocked list. The technique has been described for the particular application of the ordering of an unordered list of phonemes and words. However, as those skilled in the art will appreciate, this technique can be applied to other types of data lattices. For example the technique can be applied to a lattice which only has phonemes or a lattice which only has words. Alternatively still, it can be applied to a lattice generated from a hand writing recognition system which produces a lattice of possible characters as a result of a character recognition process. In this case, the nodes and links would not be ordered in time, but would be spatially ordered so that the characters appear in the ordered lattice at a position which corresponds to the character's position on the page relative to the other characters.

The invention claimed is:

1. An apparatus for searching a database, comprising data defining a phoneme and/or word lattice for use in the database, said data comprising data for defining a plurality of time-ordered nodes within the lattice, data for defining a plurality of links within the lattice, each link extending from a first node to a second node, data for associating a phoneme or a word with at least one node or link, and data for arranging the nodes in a sequence of time-ordered blocks so that links from nodes in any given block do not extend beyond the nodes in a block that is a predetermined number of blocks later in the sequence, in response to an input query, by a user, the apparatus comprising:
means for generating phoneme data corresponding to the user's input query;
means for searching the phoneme and word lattice using the phoneme data generated for the input query; and
means for outputting search results in dependence upon the output from said searching means.

2. An apparatus according to claim 1, further comprising means for generating word data corresponding to the user's input query and means for searching the phoneme and word lattice using the word data generated for the input query.

3. A method of searching a database, comprising data defining a phoneme and/or word lattice for use in the database, said data comprising data for defining a plurality of time-ordered nodes within the lattice, data for defining a plurality of links within the lattice, each link extending from a first node to a second node, data for associating a phoneme or a word with at least one node or link, and data for arranging the nodes in a sequence of time-ordered blocks so that links from nodes in any given block do not extend beyond the nodes in a block that is a predetermined number of blocks later in the sequence, in response to an input query by a user, the method comprising the steps of:
generating phoneme data corresponding to the user's input query;
searching the phoneme and word lattice using the phoneme data generated for the input query; and
outputting search results in dependence upon the results of said searching step.

4. A method according to claim 3, further comprising the steps of generating word data corresponding to the users input query and searching the phoneme and word lattice using the word data generated for the input query.

5. An apparatus for generating annotation data for use in annotating a data file, the apparatus comprising:
a receiver operable to receive phoneme and/or word data; and
a first generator operable to generate annotation data defining a phoneme and/or word lattice corresponding to the received phoneme and/or word data;
wherein the first generator comprises:
a second generator operable to generate node data defining a plurality of time-ordered nodes within the lattice;
a third generator operable to generate link data defining a plurality of links within the lattice, each link extending from a first node to a second node;
a fourth generator operable to generate association data associating each node or link with a phoneme or word from the phoneme and/or word data; and
a fifth generator operable to generate block data for arranging the nodes in a sequence of time-ordered blocks fulfilling a block criteria in which links from nodes in any given block do not extend beyond the nodes in a block that is a predetermined number of blocks later in the sequence.

6. An apparatus according to claim 5, wherein the block criteria is that links from nodes in any given block do not extend beyond the nodes in the succeeding block.

7. An apparatus according to claim 5, wherein the first generator comprises a processor operable to form the phoneme and/or word lattice by processing the node data for each node and the link data for each link, the processor comprising:
i) an adder operable to add one or more nodes and associated link or links to a current block of the lattice until the number of nodes in the current block reaches a predetermined number;
ii) a first determiner operable to determine if the current block can be split in accordance with said block criteria; and
iii) a splitter operable to split the current block into at least two blocks of nodes.

8. An apparatus according to claim 7, operable to generate the node data and the link data in correspondence to the phoneme and/or word data separately for each phoneme and/or word.

9. An apparatus according to claim 8, operable to generate all the node data and all the link data prior to forming the phoneme and/or word lattice.

10. An apparatus according to claim 8, operable to add the node data and link data for each phoneme and/or word to the phoneme and/or word lattice incrementally as it is generated for each said phoneme and/or word.

11. An apparatus according to claim 10, operable to add the node data and link data incrementally by:
determining if a node already exists for the start and end times for the current phoneme or word being processed;
adding to the lattice a node or nodes corresponding to the start and/or end time if they do not already exist; and
adding a link between the nodes corresponding to the start and end times for the current phoneme or word being processed.

12. An apparatus according to claim 7, further comprising a second determiner operable to determine a first timing or nodal point ($\beta$) for each block identifying the latest node in the block to which any link originating in the preceding block extends and a second timing or nodal point ($\alpha$) for each block identifying the earliest node in the block from which a link extends into the succeeding block; and wherein the first determiner is operable to determine that the current block of nodes can be split in accordance with said block criteria by determining that the first timing or nodal point (β) is before the second timing or nodal point (α) and wherein the splitter is operable to split the current block responsive to the first determiner determining that the current block of nodes can be split.

13. An apparatus according to claim 12, wherein the second determiner is operable to update the first timing or nodal point (β) and the second timing or nodal point (α) for each block, on addition of further nodes to the lattice.

14. An apparatus according to claim 12, wherein the splitter is operable to split the current block between the first timing or nodal point (β) and the second timing or nodal point (α).

15. An apparatus according to claim 14, wherein the sixth generator comprises one of the following:
  a) a processor operable to receive and process an input voice annotation signal;
  b) a processor operable to receive and process a text annotation; and
  c) a processor operable to receive image data representative of a text document and a character recognition unit for converting said image data into text data.

16. An apparatus according to claim 12, wherein the splitter is operable to split the current block by forming a new block starting at or near the first timing or nodal point (β) of the preceding block and ending at or near the first timing or nodal point (β) of the current block.

17. An apparatus according to claim 12, wherein the splitter is operable to split the current black by forming a new block starting at or near the first timing or nodal point (β) of the preceding block and ending at or near the first timing or nodal point (β) of the current block if the first timing or nodal point (β) of the preceding block is later than the second timing or nodal point (α) of the preceding block, whereas the splitter is operable to split the current block between the first timing or nodal point (β) and the second timing or nodal point (α) if the first timing or nodal point (β) of the preceding block is earlier than the second timing or nodal point (α) of the preceding block.

18. An apparatus according to claim 5, further comprising a sixth generator operable to generate the phoneme and/or word data from input audio or text data.

19. An apparatus according to claim 18, wherein the data file comprises audio data, and the sixth generator comprises an automatic speech recognition system for generating phoneme data for audio data in the data file.

20. An apparatus according to claim 19, wherein the sixth generator further comprises a word decoder for generating word data by identifying possible words within the phoneme data generated by the automatic speech recognition system.

21. An apparatus according to claim 18, wherein the data file comprises text data, and the sixth generator comprises a text-to-phoneme converter for generating phoneme data from text data in the data file.

22. An apparatus according to claim 5, wherein said first generator is operable to generate data defining time stamp information for each of said nodes.

23. An apparatus according to claim 22, wherein said data file includes a time sequential signal, and wherein said first generator is operable to generate time stamp data which is time synchronised with said time sequential signal.

24. An apparatus according to claim 23, wherein said time sequential signal is an audio and/or video signal.

25. An apparatus according to claim 5, wherein said first generator is operable to generate data which defines each block's location within the database.

26. A method of generating annotation data for use in annotating a data file, the method comprising:
  i) receiving phoneme and/or word data; and
  ii) generating annotation data defining a phoneme and/or word lattice corresponding to the received phoneme and/or word data;
  wherein the step of generating annotation data defining the lattice comprises:
  generating node data defining a plurality of time-ordered nodes within the lattice;
  generating link data defining a plurality of links within the lattice, each link extending from a first node to a second node;
  generating association data associating each link or node with a phoneme or word from the phoneme and/or word data; and
  generating block data for arranging the nodes in a sequence of time-ordered blocks fulfilling a block criteria in which links from nodes in any given block do not extend beyond the nodes in a block that is a predetermined number of blocks later in the sequence.

27. A method according to claim 26, wherein the block criteria is that links from nodes in any given block do not extend beyond the nodes in the succeeding block.

28. A method according to claim 26, wherein the step of generating annotation data defining the lattice comprises the following steps for forming the phoneme and/or word lattice by processing the node data for each node and the link data for each link:
  i) adding one or more nodes and associated link or links to a current block of the lattice until the number of nodes in the current block reaches a predetermined number;
  ii) determining that the current block can be split in accordance with said block criteria; and
  iii) splitting the current block into at least two blocks of nodes.

29. A method according to claim 28, wherein the node data and the link data is generated in correspondence to the phoneme and/or word data separately for each phoneme and/or word.

30. A method according to claim 29, wherein all the node data and all the link data is generated prior to forming the phoneme and/or word lattice.

31. A method according to claim 29, wherein the node data and link data for each phoneme and/or ward is added to the phoneme and/or word lattice incrementally as it is generated for each said phoneme and/or word.

32. A method according to claim 31, wherein the node data and link data is added incrementally by:
  determining if a node already exists for the start and end times for the current phoneme or Word being processed;
  adding to the lattice a node or nodes corresponding to the start and/or end time if they do not already exist; and
  adding a link between the nodes corresponding to the start and end times for the current phoneme or word being processed.

33. A method according to claim 28, further comprising determining a first timing or nodal point (β) for each block identifying the latest node in the block to which any link originating in the preceding block extends and a second timing or nodal point (α) for each block identifying the earliest node in the block from which a link extends into the succeeding block; and wherein the step of determining that the current block of nodes can be split in accordance with said block criteria comprises determining that the first timing or nodal point (β) is before the second timing or nodal point (α) and wherein the current block is split into the at least two blocks in response to it being determined that the current block of nodes can be split.

34. A method according to claim 33, further comprising updating the first dining or nodal point (β) and the second timing or nodal point (α) for each block, on addition of further nodes to the lattice.

35. A method according to claim 33, wherein the step of splitting the current block comprises splitting the current block between the first timing or nodal point (β) and the second timing or nodal point (α).

36. A method according to claim 33, wherein the step of splitting the current block comprises forming a new block starting at or near the first timing or nodal point (β) of the preceding block and ending at or near the first timing or nodal point (β) of the current block.

37. A method according to claim 33, wherein the step of splitting the current block comprises forming a new block starting at or near the first timing or nodal point (β) of the preceding block and ending at or near the first timing or nodal point (β) of the current block when the first timing or nodal point (β) of the preceding block is later than the second timing or nodal point (α) of the preceding block, whereas it comprises splitting the current block between the first timing or nodal point (β) and the second timing or nodal point (α) if the first timing or nodal point (β) of the preceding block is earlier than the second timing or nodal point (α) of the preceding block.

38. A method according to claim 26, further comprising toe step of generating the phoneme and/or word data from input audio or text data.

39. A method according to claim 38, wherein the data file comprises audio data, and the step of generating the phoneme and word data comprises:

using an automatic speech recognition system to generate phoneme data for audio data in the data file; and
using a word decoder to generate word data by identifying possible words within the phoneme data generated by the automatic speech recognition system.

40. A method according to claim 38, wherein the data file comprises text data, and the step of generating the phoneme and word data comprises using a text-to-phoneme converter to generate phoneme data from text data in the data file.

41. A method according to claim 38, wherein the step of generating the phoneme and/or word data comprises one of the following group:

a) receiving and processing an input voice annotation signal;
b) receiving and processing a text annotation; and
c) receiving image data representative of a text document and a character recognition unit for converting said image data into text data.

42. A method according to claim 26, further comprising generating data defining time stamp information for each of said nodes.

43. A method according to claim 42, wherein said data file includes a time sequential signal, and wherein the generated time stamp data is time synchronised with said time sequential signal.

44. A method according to claim 43, wherein said time sequential signal is an audio and/or video signal.

45. A method according to claim 26, further comprising generating data which defines each block's location within the database.

46. A method according to claim 26, further comprising forming the phoneme and/or word lattice by processing the node data for each node and the link data for each link by;

i) adding node data for two nodes and link data for one or mote links therebetween;
ii) adding block data to provide an initial block of nodes constituted by the two added nodes;
iii) adding to the initial block of nodes further node data and/or link data for one or more thither nodes and/or links;
iv) repeating (iii) until the number of nodes in the initial block reaches a predetermined number of nodes;
v) determining that the initial block of nodes can be split in accordance with said block criteria;
vi) adding further block data to split the initial block of nodes into at least two current blocks of nodes;
vii) adding to one of the current blocks of nodes further node data and/or link data for one or more further nodes and/or links;
viii) repeating (vii) until the number of nodes in any current block is identified as reaching the predetermined number of nodes;
ix) determining that the identified current block can be split in accordance with said block criteria;
x) adding further block data to split the identified current block into at least two blocks;
xi) repeating (viii), (ix) and (x) if required until the node data and link data for all of the nodes and links generated for the phoneme and/or word data has been added to the phoneme and/or word lattice.

47. An apparatus for generating annotation data for use in annotating a data file, the apparatus comprising:

receiving means for receiving phoneme and/or word data; and
first generating means for generating annotation data defining a phoneme and/or word lattice corresponding to the received phoneme and/or word data;
wherein the first generating means comprises:
second generating means for generating node data defining a plurality of time-ordered nodes within the lattice;
third generating means for generating link data defining a plurality of links within the lattice, each link extending from a first node to a second node;
fourth generating means for generating association data associating each node or link with a phoneme or word from the phoneme and/or word data; and
fifth generating means for generating block data for arranging the nodes in a sequence of time-ordered blocks fulfilling a block criteria in which links from nodes in any given block do not extend beyond the nodes in a block that is a predetermined number of blocks later in the sequence.

48. A computer readable medium storing computer executable instructions for causing a programmable computer device to carry out a method of searching a database, comprising data defining a phoneme and/or word lattice for use in the database, said data comprising data for defining a plurality of time-ordered nodes within the lattice, data for defining a plurality of links within the lattice, each link extending from a first node to a second node, data for associating a phoneme or a word with at least one node or link, and data for arranging the nodes in a sequence of time-ordered blocks so that links from nodes in any given block do not extend beyond the nodes in a block that is a predetermined number of blocks later in the sequence in response to an input query by a user, the instructions comprising:

instructions for generating phoneme data corresponding to the user's input query;

instructions for searching the phoneme and word lattice using the phoneme data generated for the input query; and instructions for outputting search results in dependence upon the results of said searching step.

49. Computer executable instructions for causing a programmable computer device to carry out a method of searching a database, comprising data defining a phoneme and/or word lattice for use in the database; said data comprising data for defining a plurality of time-ordered nodes within the lattice, data for defining a plurality of links within the lattice, each link extending from a first node to a second node, data for associating a phoneme or a word with at least one node or link, and data for arranging the nodes in a sequence of time-ordered blocks so that links from nodes in any given block do not extend beyond the nodes in a block that is a predetermined number of blocks later in the sequence, in response to an input query by a user, the instructions comprising:

instructions for generating phoneme data corresponding to the user's input query;

instructions for searching the phoneme and word lattice using the phoneme data generated for the input query; and instructions for outputting search results in dependence upon the results of said searching step.

50. A computer readable medium storing computer executable instructions for causing a programmable computer device to carry out a method of generating annotation data for use in annotating a data file, the computer executable instructions comprising:

instructions for receiving phoneme and/or word data; and instructions for generating annotation data defining a phoneme and/or word lattice corresponding to the received phoneme and/or word data;

wherein the instructions for generating annotation data defining the lattice comprise:

instructions for generating node data defining a plurality of time-ordered nodes within the lattice;

instructions for generating link data defining a plurality of links within the lattice, each link extending from a first node to a second node;

instructions for generating association data associating each link or node with a phoneme or word from the phoneme and/or word data; and instructions for generating block data for arranging the nodes in a sequence of time-ordered blocks fulfilling a block criteria in which links from nodes in any given block do not extend beyond the nodes in a block that is a predetermined number of blocks later in the sequence.

51. Computer executable instructions for causing a programmable computer device to carry out a method of generating annotation data for use in annotating a data file, the computer executable instructions comprising:

instructions for receiving phoneme and/or word data; and instructions for generating annotation data defining a phoneme and/or word lattice corresponding to the received phoneme and/or word data;

wherein the instructions for generating annotation data defining the lattice comprise:

instructions for generating node data defining a plurality of time-ordered nodes within the lattice;

instructions for generating link data defining a plurality of links within the lattice, each link extending from a first node to a second node;

instructions for generating association data associating each link or node with a phoneme or word from the phoneme and/or word data; and instructions for generating block data for arranging the nodes in a sequence of time-ordered blocks fulfilling a block criteria in which links from nodes in any given block do not extend beyond the nodes in a block that is a predetermined number of blocks later in the sequence.

* * * * *

UNITED STATES PATENT AND TRADEMARK OFFICE
CERTIFICATE OF CORRECTION

| | |
|---|---|
| PATENT NO. | : 7,240,003 B2 |
| APPLICATION NO. | : 10/363752 |
| DATED | : July 3, 2007 |
| INVENTOR(S) | : Charlesworth et al. |

It is certified that error appears in the above-identified patent and that said Letters Patent is hereby corrected as shown below:

COVER SHEET:
(56) Other Publications, Page 2, In "Sankoff, D., et al,", "Sandkoff" should read -- Sankoff --; and
(56) Other Publications, Page 3, "Sankoff, D., et al., "Time Warps, -- etc." (duplicate) should be deleted.

COLUMN 2:
Line 13, "links are" should read -- links are permitted to extend from one block to another. --.

COLUMN 7:
Line 63, "are-time" should read -- are time --.

COLUMN 28:
Line 50, "ward" should read -- word --; and
Line 56, "Word" should read -- word --.

COLUMN 29:
Line 37, "toe" should read -- the --.

COLUMN 30:
Line 8, "by;" should read -- by: --;
Line 10, "mote" should read -- more --; and
Line 14, "thither" should read -- further --.

UNITED STATES PATENT AND TRADEMARK OFFICE
CERTIFICATE OF CORRECTION

PATENT NO. : 7,240,003 B2
APPLICATION NO. : 10/363752
DATED : July 3, 2007
INVENTOR(S) : Charlesworth et al.

It is certified that error appears in the above-identified patent and that said Letters Patent is hereby corrected as shown below:

COLUMN 31:
Line 16, "database;" should read -- database, --.

Signed and Sealed this

Thirteenth Day of May, 2008

JON W. DUDAS
*Director of the United States Patent and Trademark Office*